United States Patent
Pau et al.

(10) Patent No.: US 7,233,623 B1
(45) Date of Patent: Jun. 19, 2007

(54) METHOD AND SCALABLE ARCHITECTURE FOR PARALLEL CALCULATION OF THE DCT OF BLOCKS OF PIXELS OF DIFFERENT SIZES AND COMPRESSION THROUGH FRACTAL CODING

(75) Inventors: Danilo Pau, Sesto San Giovanni (IT); Roberto Sannino, Romano Lombardo (IT); Andrea Capasso, Bari (IT); Pasqualina Fragneto, Vitulano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1109 days.

(21) Appl. No.: 09/390,554

(22) Filed: Sep. 3, 1999

(30) Foreign Application Priority Data

Sep. 7, 1998 (EP) .................................. 98830522

(51) Int. Cl.
*H04N 7/12* (2006.01)
*G06K 9/36* (2006.01)

(52) U.S. Cl. .................................. 375/240.2; 382/250
(58) Field of Classification Search ............ 375/240.2, 375/240.18, 240.19, 240.24; 382/232, 249, 382/304, 302, 250, 234; 708/401
See application file for complete search history.

(56) References Cited

U.S. PATENT DOCUMENTS

| | | | | |
|---|---|---|---|---|
| 4,293,920 A | * | 10/1981 | Merola ......................... | 708/401 |
| 5,293,434 A | * | 3/1994 | Feig et al. .................... | 382/234 |
| 5,416,856 A | * | 5/1995 | Jacobs et al. ................ | 382/232 |
| 5,497,435 A | * | 3/1996 | Berger ......................... | 382/249 |
| 5,689,592 A | * | 11/1997 | Ericsson et al. ............. | 382/304 |

OTHER PUBLICATIONS

Rafael C. Gonzalez and Richard E. Woods, Digital Image Processing (Addison-Wesley Publ. Co. 1992), pp. 374-389.*
Zhao et al., "*A Hybrid Image Compression Scheme Combining Block-Based Fractal Coding and DCT*," Signal Processing Image Communication, vol. 8, No. 2, Mar. 1, 1996, pp. 73-78.
Barthel et al., "*Adaptive Fractal Image Coding in the Frequency Domain*," Journal on Communications, vol. 45, May 1994, pp. 33-38.
Artieri, et al., "*A One Chip VLSI for Real Time Two-Dimensional Discrete Cosine Transform*," Proceedings of the International Symposium on Circuits and Systems, vol. 1, Conf. No. 21, Jun. 7, 1988, pp. 701-704.
deFarcia, et al., "*Hybrid Fractal/DCT Coding of Video*," International Conference on Image Processing and Its Applications, No. 410, Jul. 4, 1995, pp. 321-325.
Au et al., "*Fast Fractal Encoding in Frequency Domain*," Proceedings of International Conference on Image Processing, vol. 2, Oct. 26, 1997, pp. 298-301.

* cited by examiner

*Primary Examiner*—Gims Philippe
(74) *Attorney, Agent, or Firm*—Lisa K. Jorgenson; Allen, Dyer, Doppelt, Milbrath & Gilchrist, P.A.

(57) ABSTRACT

A method of calculating the discrete cosine transform (DCT) of blocks of pixels of a picture includes the steps of defining first subdivision blocks called range blocks, having a fractional and scaleable size $N/2^i * N/2^i$, where i is an integer number, with respect to a maximum pre-defined size of $N*N$ pixels of blocks of division of the picture, referred to as domain blocks, shiftable by intervals of $N/2^i$ pixels. The method also includes the step of calculating the DCT on $2^i$ range blocks of a subdivision of a domain block of $N*N$ pixels of the picture, in parallel.

8 Claims, 24 Drawing Sheets

FIG. 7

|   | 0 | 1 | 2 | 3 | 4 | 5 | 6 | 7 |
|---|---|---|---|---|---|---|---|---|
| 7 | s(7) | s(6) | s(5) | s(4) | s(3) | s(2) | s(1) | s(0) |
| 6 | r(2) | r(7) | r(3) | r(1) | r(6) | r(4) | r(0) | r(5) |
| 5 | q(1) | q(4) | q(7) | q(5) | q(2) | q(0) | q(3) | q(6) |
| 4 | p(3) | p(5) | p(1) | p(7) | p(0) | p(6) | p(2) | p(4) |
| 3 | o(4) | o(2) | o(6) | o(0) | o(7) | o(1) | o(5) | o(3) |
| 2 | n(6) | n(3) | n(0) | n(2) | n(5) | n(7) | n(4) | n(1) |
| 1 | m(5) | m(0) | m(4) | m(6) | m(1) | m(3) | m(7) | m(2) |
| 0 | l(0) | l(1) | l(2) | l(3) | l(4) | l(5) | l(6) | l(7) |

*FIG. 10*

METHOD AND SCALABLE ARCHITECTURE FOR PARALLEL CALCULATION OF THE DCT OF BLOCKS OF PIXELS OF DIFFERENT SIZES AND COMPRESSION THROUGH FRACTAL CODING

FIELD OF THE INVENTION

The invention relates in general to digital processing systems for recording and/or transmitting pictures, and more in particular to systems for compressing and coding pictures by calculating the discrete cosine transform (DCT) of blocks of pixels of a picture. The invention is particularly useful in video coders according to the MPEG2 standard though it is applicable also to other systems.

BACKGROUND OF THE INVENTION

The calculation of the discrete cosine transform (DCT) of a pixel matrix of a picture is a fundamental step in processing picture data. A division by a quantization matrix is performed on the results of the discrete cosine transform for reducing the amplitude of the DCT coefficients, as a precondition to data compression which occurs during a coding phase, according to a certain transfer protocol of video data to be transmitted or stored. Typically, the calculation of the discrete cosine transform is carried out on blocks or matrices of pixels, in which a whole picture is subdivided for processing purposes.

Increasing speed requisites of picture processing systems for storage and/or transmission, imposes the use of hardware architectures to speed up various processing steps among which, primarily, the step of discrete cosine transform calculation by blocks of pixels. Use of hardware processing imposes a pre-definition of few fundamental parameters, namely the dimensions of the blocks of pixels into which a picture is subdivided to meet processing requisites.

Such a pre-definition may represent a heavy constraint that limits the possibility of optimizing the processing system, for example a MPEG2 coder, or its adaptability to different conditions of use in terms of different performance requisites. It is also evident the enormous economic advantage in terms of reduction of costs of an integrated data processing system that may be programmed to calculate in parallel the DCT on several blocks of pixels of size selectable among a certain number of available sizes.

SUMMARY OF THE INVENTION

It is evident that a need exists for a method and of a hardware architecture for calculating the discrete cosine transform (DCT) on a plurality of blocks of pixels, in parallel, which provides for the scalability of the size of the blocks of pixels. For example, the calculation of the discrete cosine transform (DCT) either for one block of 8×8 pixels, or four blocks of 4×4 pixels in parallel, or for sixteen blocks of 2×2 pixels in parallel, operating a selection of the block's size.

Scalability of the size of the block of pixels and the possibility of performing the calculation of the discrete cosine transform in parallel on blocks of congruently reduced size compared to a certain maximum block's size, by a hardware structure is also instrumental of the implementation of highly efficient "hybrid" picture compression schemes and algorithms. For example, by virtue of the scalability of the block size and of the ability to calculate in parallel the DCT on more blocks, it is possible, according to the present invention, to implement a fractal coding applied in the DCT domain rather than in the space domain of picture data, as customary.

Therefore, another important aspect of the invention is a new picture data compressing and coding method that practically is made possible by a hardware structure calculating the DCT on blocks of scaleable size and which includes

- subdividing a picture by defining two distinct types of subdivision blocks: a first type, of N/i*N/i dimension called range blocks that are not overimposable one on another, and a second type, of N*N dimension, called domain blocks, that are transferable by intervals of N/i pixels and overimposable one on another (by transferring on the original picture a window that identifies a domain block by an interval equivalent to the horizontal and/or vertical dimension of a range block);
- calculating the discrete cosine transform (DCT) of the $2^i$ range blocks and of a relative domain block in parallel;
- classifying the transform range blocks according to their relative complexity calculated by summing the three AC coefficients;
- applying the fractal transform in the DCT domain to the data of range blocks whose complexity exceeds a pre-defined threshold and storing only the DC coefficient of the range blocks with a complexity lower than said threshold, identifying a relative domain block belonging to the range block being transformed that produces the best fractal approximation of the same range block and calculating its discrete cosine transform;
- calculating a difference picture between each range block and its fractal approximation;
- quantizing said difference picture in the DCT domain by using a quantization table predisposed in function of human sight characteristics;
- coding said quantized difference picture by a method based on the probability of the quantization coefficients;
- storing or transmitting the coding code for each range block compressed in the DCT domain and the DC coefficient of each uncompressed range block.

By indicating with $F_R(u,v)$, the DCT of a generic range block, in the domain of the DCT, the AC coefficients indicate the block's complexity. For the case of N=8, the four coefficients at the top left of the block are:
- the DC coefficient that occupies the position 00; and
- the three AC coefficients that occupy the positions 01, 10 and 11, respectively.

The AC coefficients are used to decide to which a certain range block belongs: if the sum of their absolute values is less that a determined threshold T, the block range in question is classified as a "low activity" block, on the contrary, if the sum is equal or greater than T, the range block is classified as a "high activity" block.

For a low activity range block, the AC coefficients are small and therefore they may be omitted without significantly affecting fidelity: in this case the block may be approximated by storing only its DC coefficient.

For a high activity range block, the progression of fractal coding of the invention includes searching two appropriate linear transform, for example, rotations, $\phi$, overturns, $\tau$, or the like and a domain block DCT, of which being defined by $F_D(u,v)$, which at least approximately satisfy the following equation:

$$F_R(u,v) = \phi(F_D(u,v))$$

$$F_R(u,v) = \tau(F_D(u,v)) \qquad (1)$$

Having so identified the domain block most similar or homologous to the range block that is being processed, its parameters $F_D(u,v),\tau,\phi$ are stored. The difference picture between the range block and its fractal position is then calculated:

$$D(u,v)=F_R(u,v)-\phi(F_D(u,v))$$

$$D(u,v)=F_R(u,v)-\tau(F_D(u,v)) \quad (2)$$

By quantizing the difference picture D(u,v), $$D_Q(u,v)=INTEG[D(u,v)/Q(u,v)] \quad (3)$$

is obtained, where:
  DQ(u,v) is the quantized difference picture in the domain of DCT;
  Q(u,v) is a quantization table designed by considering human sight characteristics;
  INTEG is a function that approximates its argument to the nearest integer;

After quantization, the majority of the $D_Q(u,v)$ coefficients are null. Therefore, it is easy to design a coding, for example Huffman coding, based on the probabilities of the coefficients. Finally, the code to be recorded or transmitted is stored. The compression procedure terminates when each range block has been coded.

BRIEF DESCRIPTION OF THE DRAWINGS

The different aspects and implementations of the scaleable architecture for calculating the discrete cosine transform of the invention as well as of the method of compression and fractal coding, will be more easily understood through the following detailed description of an embodiment of the architecture of the invention and of the different functioning modes according to a selection of the size selection of the blocks of pixels into which the picture is divided by referring to the annexed drawings, wherein:

FIG. 7 shows the arrangement of the input data for calculating the four 4×4 DCTs;
FIG. 10 shows the arrangement of the input data for calculating an 8×8 DCT.

DETAILED DESCRIPTION OF THE PREFERRED EMBODIMENTS

Though referring in some of the scheme illustrated in the figures to a particularly significant and effective implementation of the architecture of parallel computation of the discrete cosine transform (DCT) on blocks of pixels of scaleable size, which comprises a compression phase for the fractal coding of the picture data, it is understood that the method and architecture of parallel calculation of the discrete cosine transformed (DCT) of a bidimensional matrix of input data by blocks of a scaleable size, provide for an exceptional freedom in implementing particularly effective compression algorithms by exploiting the scalability and the possibility of a parallel calculation of DCT.

The partitioning steps and the calculation of the discrete cosine transform of a bidimensional matrix of input data will be described separately for each size of range block, according to an embodiment of the invention, starting from the smallest block dimension of 2×2 for which the DCT calculation is performed in parallel, up to the maximum block dimension of 8×8. This description of an architecture scaleable according to needs by changing the value of the global variable size, will follow.

The procedure for a parallel DCT computation of the invention may be divided in distinct phases:
INPUT phase
PROCESS phase
ORDER phase
OUTPUT phase.

Each phase is hereinbelow described for each case considered.

The DCT operation may be defined as follows.
For an input data matrix $x_{N*N}=[x_{i,j}], 0 \leq i,j \leq N-1$, the output matrix $y_{N*N}=[y_{m,n}], 0 \leq m,n \leq N-1$, is defined by:

$$y_{m,n} = \frac{2}{N}\varepsilon(m)\varepsilon(n)\sum_{i=0}^{N-1}\sum_{j=0}^{N-1} x_{i,j}\cos\left(\frac{(2i+1)m}{2N}\pi\right)\cos\left(\frac{(2j+1)n}{2N}\pi\right) \quad (4)$$

where $$\varepsilon(n) = \begin{cases} \frac{1}{\sqrt{2}} \text{ per } n = 0 \\ 1 \text{ per } 1 \leq n \leq N-1 \end{cases}$$

For convenience, assume that $N=2^i$, where i is an integer and $i \geq 1$. Let's remove $\epsilon(m)$, $\epsilon(n)$, and the normalization value 2/N from equation (4), in view of the fact that they may be reintroduced in a successive step. Therefore, from now on, the following simplified version of equation (4) will be used:

$$y_{m,n} \sum_{i=0}^{N-1} \sum_{j=0}^{N-1} x_{i,j} \cos\left[\frac{(2i+1)m}{2N}\pi\right] \cos\left[\frac{(2j+1)m}{2N}\pi\right] \quad (5)$$

Parallel Computation of Sixteen 2×2 DCTs

For N=2 equation (5) becomes:

$$y_{m,n} \sum_{i=0}^{1} \sum_{j=0}^{1} x_{i,j} \cos\left[\frac{(2i+1)m}{4}\pi\right] \cos\left[\frac{(2j+1)n}{4}\pi\right] \quad (6)$$

Figure 2:
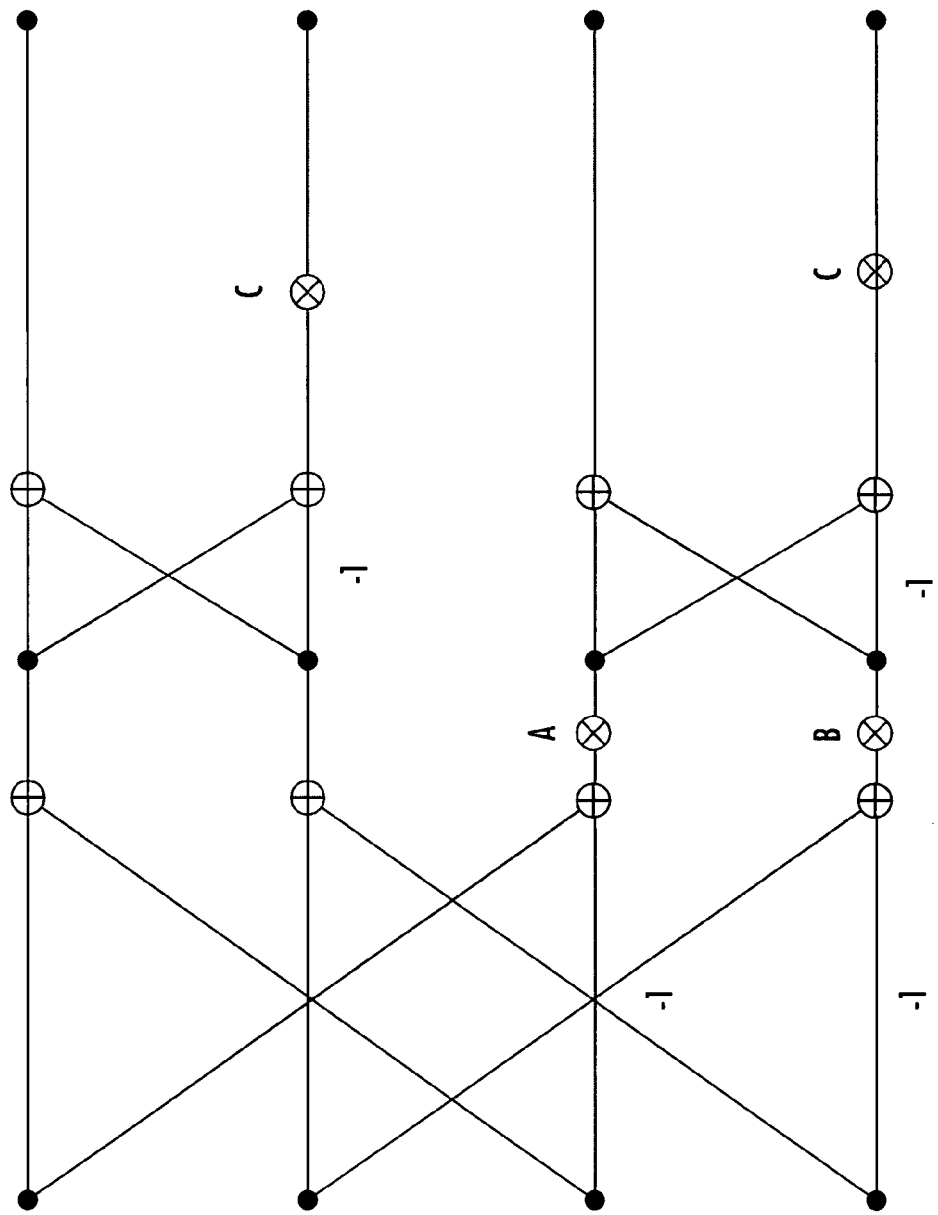
FIG. 2 is a flow chart of the parallel computation of the DCT of sixteen blocks of 2×2-pixel size.

The flow graph for a 2×2 DCT is shown in FIG. 2, in which A=B=C=1 and the input and output data are the pixels in the positions (0,0), (0,1), (1,0), (1,1).

Figure 3:
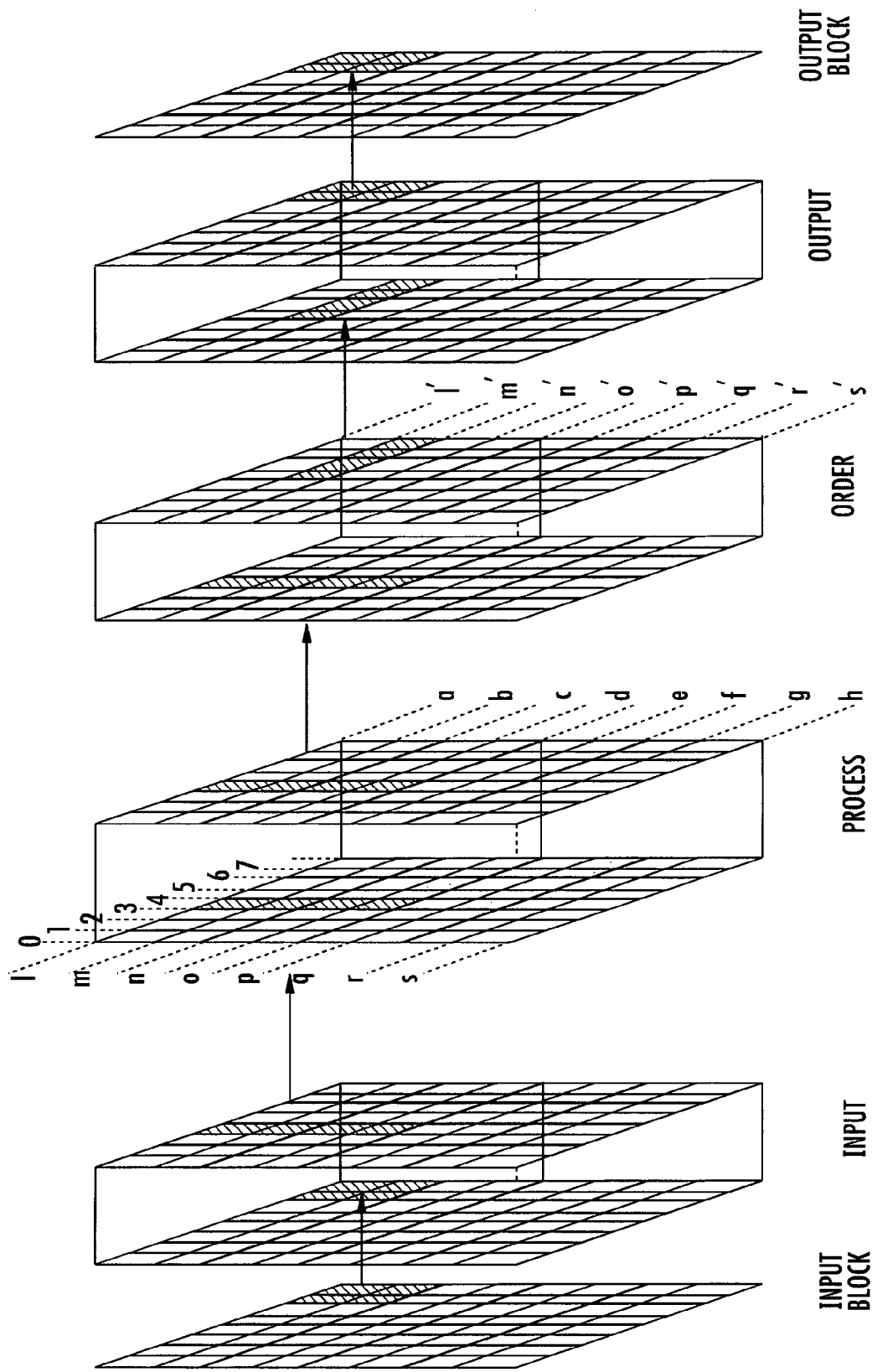
FIG. 3 illustrates the architecture for parallel computation of sixteen 2×2 DCTs.

Let us now consider how to calculate in parallel sixteen 2×2 DCTs in which an 8×8 block is subdivided. The procedure is divided in many steps, a global view of which is depicted in FIG. 3. This figure highlights the transformations performed on the 2×2 block constituted by the pixels (0,6), (0,7), (1,6), (1,7).

The pixels that constitute the input block are ordered in the INPUT phase and are processed in the PROCESS phase to obtain the coefficients of the sixteen bidimensional DCTs, or briefly 2-D DCTs, on four samples, for example, the 2-D DCT of the block (0,1) constituted by:
{l[0],m[0],n[0],o[0]} is {a[0],b[0],c[0],d[0]}

The coefficients of the 2D DCT are re-arranged in the ORDER phase into eight vectors of eight components. For example the coefficients {a[0],b[0],c[0],d[0]} constitute the vector l'. The vectors thus obtained proceed to the OUTPUT phase to give the coefficients of the 2×2 DCT, constituting the output block.

INPUT Phase

The pixels of each block (i,j), with 0≦i≦1 and 0≦j≦3, are ordered to the eight-component vectors l, m, n, o in the following manner:
  the pixels that occupy the position (0,0) in the block constitute the vector l;
  the pixels that occupy the position (0,1) in the block constitute the vector m;
  the pixels that occupy the position (1,0) in the block constitute the vector n;
  the pixels that occupy the position (1,1) in the block constitute the vector o.

Similarly, the pixels of each block (i,j), with 2≦i≦3 and 0≦i≦3, are ordered to constitute the eight-component vectors p, q, r, s in the following manner:
  the pixels that occupy the position (0,0) in the block constitute the vector p;
  the pixels that occupy the position (0,1) in the block constitute the vector q;
  the pixels that occupy the position (1,0) in the block constitute the vector r;

the pixels that occupy the position (1,0) in the block constitute the vector s.

Figure 4:
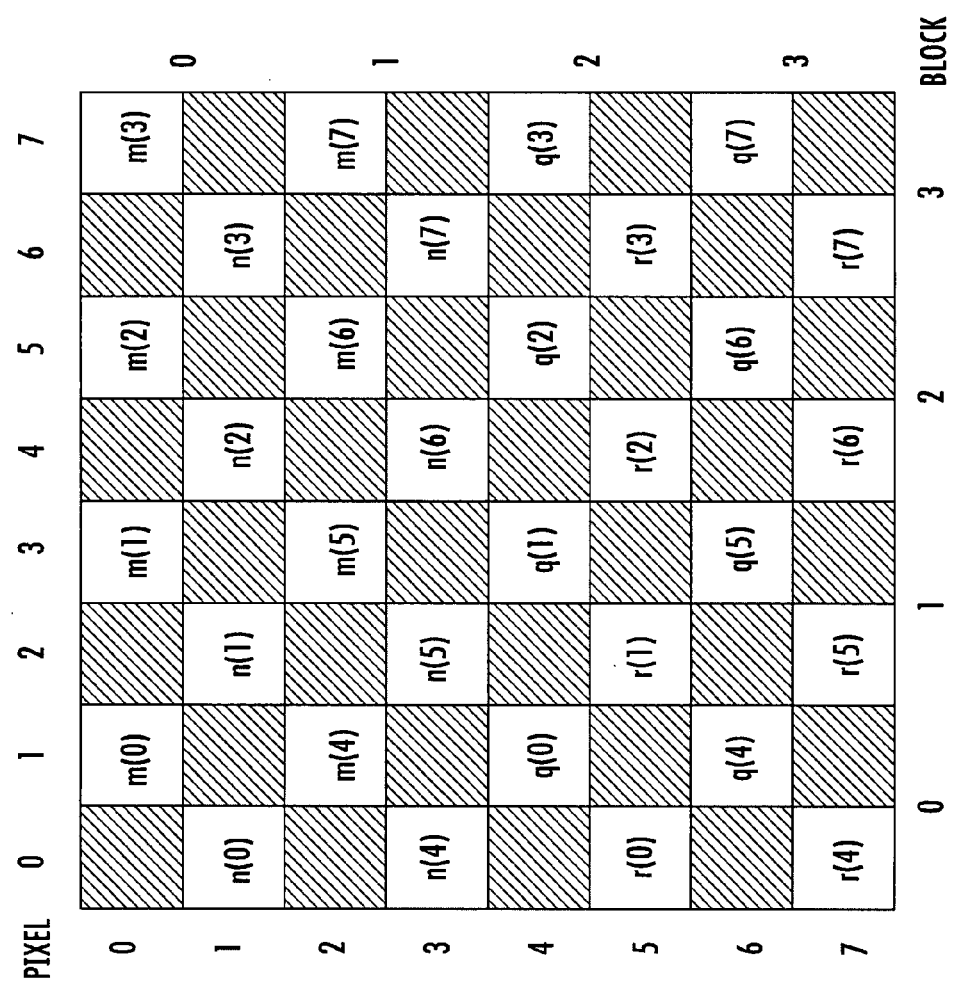
FIG. 4 shows the arrangement of the input data for calculating the sixteen 2×2 DCTs.

This arrangement is detailed in FIG. 4. It should be noted, for example, that the pixels of the block (0,3) will constitute the third component of the l, m, n, o vectors.

PROCESS Phase

Figure 5:
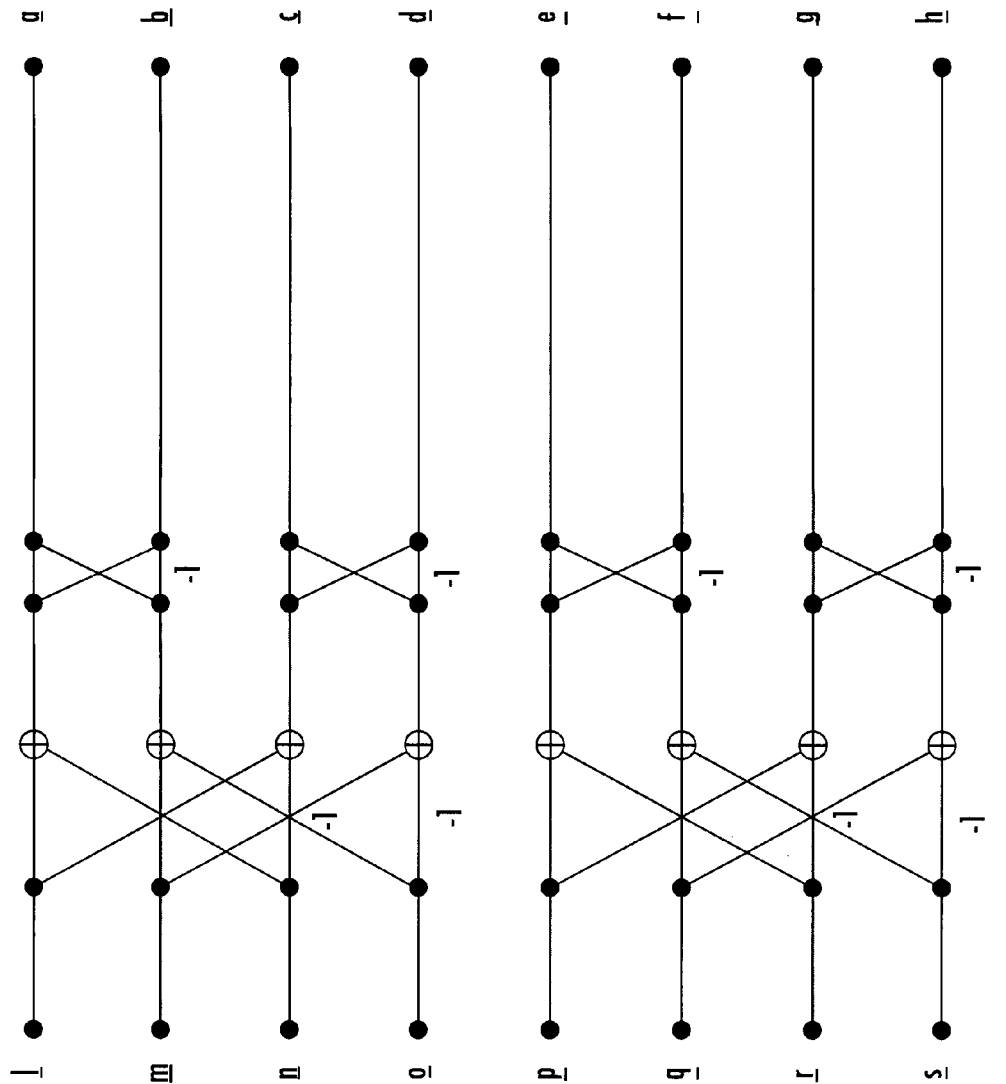
FIG. 5 shows the PROCESS phase of the calculating procedure of sixteen 2×2 DCTs.

The PROCESS phase includes calculating in parallel the sixteen 2-D DCTs by processing the eight-component vectors l, m, . . . , s as shown in FIG. 5. It is noted for example, that the coefficients of the 2-D DCT of the block (0,3) will constitute the third component of the vectors a, b, c, d of FIG. 3.

ORDER Phase

The ORDER phase includes arranging the output sequences of the eight 2-D DCTs in eight vectors l', m', . . . , s' thus defined:

$$l' = \begin{bmatrix} a[0] \\ b[0] \\ c[0] \\ d[0] \\ a[1] \\ b[1] \\ c[1] \\ d[1] \end{bmatrix}, m' = \begin{bmatrix} a[2] \\ b[2] \\ c[2] \\ d[2] \\ a[3] \\ b[3] \\ c[3] \\ d[3] \end{bmatrix}, n' = \begin{bmatrix} a[4] \\ b[4] \\ c[4] \\ d[4] \\ a[5] \\ b[5] \\ c[5] \\ d[5] \end{bmatrix},$$

$$o' = \begin{bmatrix} a[6] \\ b[6] \\ c[6] \\ d[6] \\ a[7] \\ b[7] \\ c[7] \\ d[7] \end{bmatrix}, p' = \begin{bmatrix} e[0] \\ f[0] \\ g[0] \\ h[0] \\ e[1] \\ f[1] \\ g[1] \\ h[1] \end{bmatrix}, q' = \begin{bmatrix} e[2] \\ f[2] \\ g[2] \\ h[2] \\ e[3] \\ f[3] \\ g[3] \\ h[3] \end{bmatrix},$$

$$r' = \begin{bmatrix} e[4] \\ f[4] \\ g[4] \\ h[4] \\ e[5] \\ f[5] \\ g[5] \\ h[5] \end{bmatrix}, s' = \begin{bmatrix} e[6] \\ f[6] \\ g[6] \\ h[6] \\ e[7] \\ f[7] \\ g[7] \\ h[7] \end{bmatrix}.$$

It is noted, for example, that the coefficients of the 2-D DCT of the block (0,3) will constitute the components 4, 5, 6, 7 of the vector m'.

OUTPUT Phase

This phase includes rearranging the output data: starting from the eight-component vectors a, b, . . . , h, a 64 component vector defined as follows, is constructed:

$$\begin{bmatrix} y[0] & y[1] & \cdots & y[7] \\ \vdots & \vdots & \vdots & \vdots \\ y[54] & y[55] & \cdots & y[63] \end{bmatrix} = \begin{bmatrix} l[0] & l[1] & l[4] & l[5] & m[0] & m[1] & m[4] & m[5] \\ l[2] & l[3] & l[6] & l[7] & m[2] & m[3] & m[6] & m[7] \\ n[0] & n[1] & n[4] & n[5] & o[0] & o[1] & o[4] & o[5] \\ n[2] & n[3] & n[6] & n[7] & o[2] & o[3] & o[6] & o[7] \\ p[0] & p[1] & p[4] & p[5] & q[0] & q[1] & q[4] & q[5] \\ p[2] & p[2] & p[6] & p[7] & q[2] & q[3] & q[6] & q[7] \\ r[0] & r[1] & r[4] & r[5] & s[0] & s[1] & s[4] & s[5] \\ r[2] & r[2] & r[6] & r[7] & s[2] & s[3] & s[6] & s[7] \end{bmatrix} \quad (7)$$

Parallel Computation of Four 4×4 DCTs

For N=4, equation (5) becomes $$y_{m,n} \sum_{i=0}^{3} \sum_{j=0}^{3} x_{i,j} \cos\left[\frac{(2i+1)m}{8}\pi\right] \cos\left[\frac{(2j+1)n}{8}\pi\right] \quad (8)$$

If:

$$Y_{16*1} = \begin{bmatrix} y_0 \\ y_1 \\ y_2 \\ y_3 \end{bmatrix}, \quad F_{64*1} = \begin{bmatrix} f_0 \\ f_1 \\ f_2 \\ f_3 \end{bmatrix}$$

where:

$y_i = [y_{i,0}, y_{i,1}, y_{i,2}, y_{i,3}]'$
$\{f_{0,r}\}_{r=0}^{3} = DCT(\{A_{1,i}\}_{i=0}^{3})$, $\{f_{2,r}\}_{r=0}^{3} = DCT(\{B_{3,i}\}_{i=0}^{3})$
$\{f_{1,r}\}_{r=0}^{3} = DCT(\{A_{3,i}\}_{i=0}^{3})$, $\{f_{3,r}\}_{r=0}^{3} = DCT(\{B_{1,i}\}_{i=0}^{3})$
$\{A_{1,i}\}_{i=0}^{3} = \{x_{0,0}, x_{1,1}, x_{2,2}, x_{3,3}\}$,
$\{A_{3,i}\}_{i=0}^{3} = \{x_{1,0}, x_{3,1}, x_{0,2}, x_{2,3}\}$,
$\{B_{3,i}\}_{i=0}^{3} = \{x_{2,0}, x_{0,1}, x_{3,2}, x_{1,3}\}$, it may be demonstrated that:

$$Y_{16*1} = (E_4)_{16} F_{16*1} \quad (9)$$

where:

$$(E_4)_{16} = \begin{bmatrix} (H_0)_4 & (H_0)_4 & (H_0)_4 & (H_0)_4 \\ (H_1)_4 & (H_3)_4 & -(H_3)_4 & -(H_1)_4 \\ (H_2)_4 & -(H_2)_4 & -(H_2)_4 & (H_2)_4 \\ (H_3)_4 & -(H_1)_4 & (H_1)_4 & -(H_3)_4 \end{bmatrix} \quad (10)$$

The matrices $(H_i)_4$, i=0, 1, 2, 3 are as follows:

$$(H_0)_4 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}, (H_1)_4 = \begin{bmatrix} 0 & 1 & 0 & 0 \\ \frac{1}{2} & 0 & \frac{1}{2} & 0 \\ 0 & \frac{1}{2} & 0 & \frac{1}{2} \\ 0 & 0 & \frac{1}{2} & 0 \end{bmatrix},$$

-continued $$(H_2)_4 = \begin{bmatrix} 0 & 0 & 1 & 0 \\ 0 & \frac{1}{2} & 0 & \frac{1}{2} \\ \frac{1}{2} & 0 & 0 & 0 \\ 0 & \frac{1}{2} & 0 & -\frac{1}{2} \end{bmatrix}, (H_3)_4 = \begin{bmatrix} 0 & 0 & 0 & 1 \\ 0 & 0 & \frac{1}{2} & 0 \\ 0 & \frac{1}{2} & 0 & -\frac{1}{2} \\ \frac{1}{2} & 0 & -\frac{1}{2} & 0 \end{bmatrix}.$$

The monodimensional DCT, or briefly the 1-D DCT, is expressed by the matrix (1-D DCT)$_4$ given by:

$$C_4 = \begin{bmatrix} 1 & 1 & 1 & 1 \\ C_8^1 & C_8^3 & -C_8^3 & -C_8^1 \\ C_4^1 & -C_4^1 & -C_4^1 & C_4^1 \\ C_8^3 & -C_8^1 & C_8^1 & -C_8^3 \end{bmatrix} \text{ where } C_n^m = \cos\left(\frac{m}{n}\pi\right)$$

From these equations it may be said that the computation of one 4×4 DCT may be divided into two steps:
computation of four 1-D DCT, each performed on an appropriate sequence of four pixels.
computation of the 2-D DCT starting from the four 1-D DCT.

Figure 6:
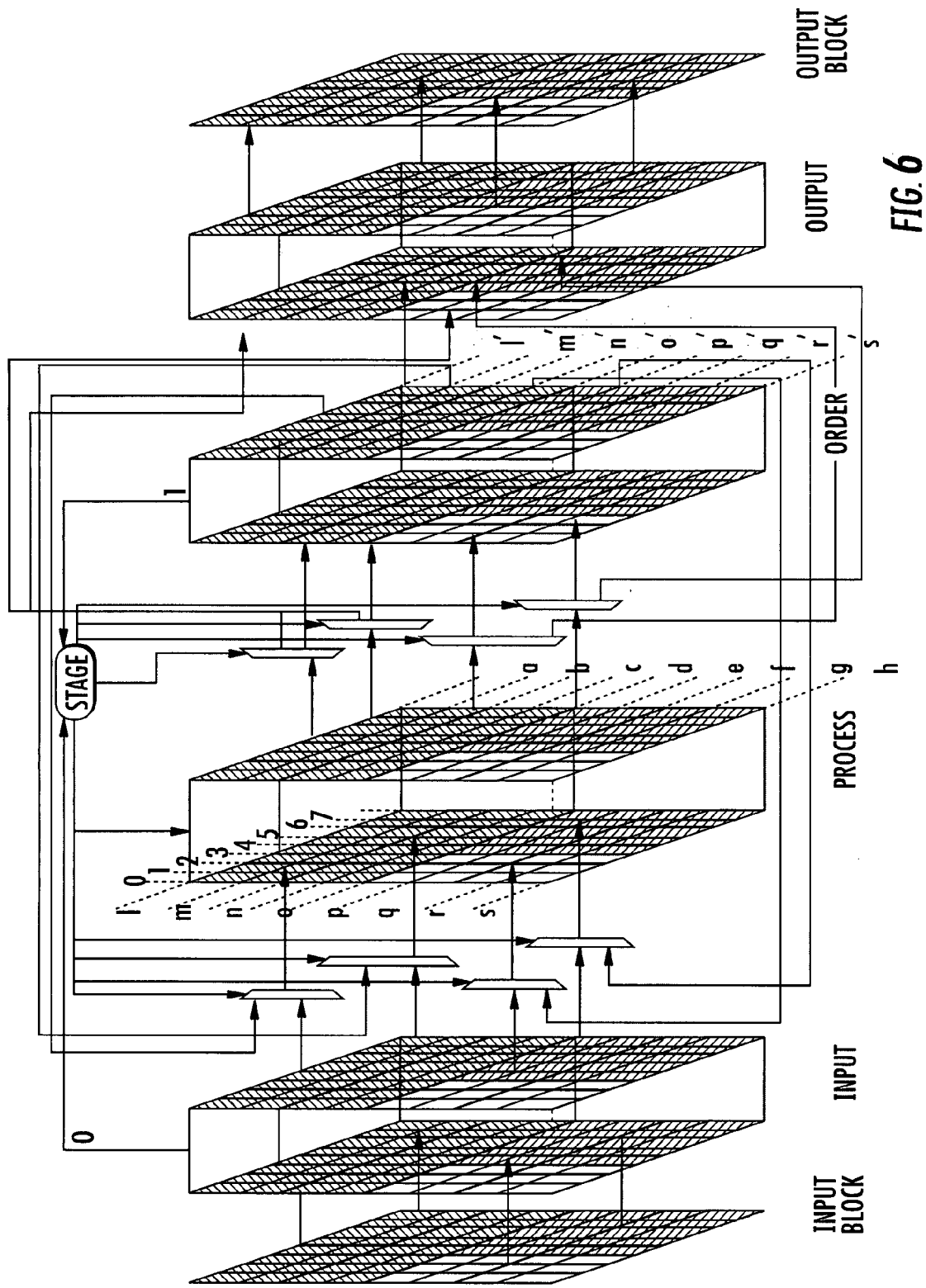
FIG. 6 illustrates the architecture for parallel computation of four 4×4 DCTs.

These two steps are carried out in a similar manner, and are implemented with the same hardware that is used twice. Let us consider now how to calculate in parallel four 4×4 DCTs. The total 64 samples are obtained from the 4×4 blocks into which an 8×8 block is subdivided. The procedure is subdivided in distinct phases to each of which corresponds an architectural block. A whole view is shown in FIG. 6. This figure highlights the transformations carried out on each 4×4 block.

INPUT Phase

The pixel of each quadrant (i,j), $0 \leq i,j \leq 1$ are ordered to constitute the vectors:

$$A_1^{i,j} = \begin{bmatrix} x_{0,0}^{i,j} \\ x_{1,1}^{i,j} \\ x_{2,2}^{i,j} \\ x_{3,3}^{i,j} \end{bmatrix}, A_3^{i,j} = \begin{bmatrix} x_{1,0}^{i,j} \\ x_{3,1}^{i,j} \\ x_{0,2}^{i,j} \\ x_{2,3}^{i,j} \end{bmatrix}, B_3^{i,j} = \begin{bmatrix} x_{2,0}^{i,j} \\ x_{0,1}^{i,j} \\ x_{3,2}^{i,j} \\ x_{1,3}^{i,j} \end{bmatrix}, B_1^{i,j} = \begin{bmatrix} x_{3,0}^{i,j} \\ x_{2,1}^{i,j} \\ x_{1,2}^{i,j} \\ x_{0,3}^{i,j} \end{bmatrix}$$

After arranging the data in 16 four-component vectors, we define the eight-component vectors l, m, n, o, constituted by the first, second, third and fourth components, respectively, of the initial vectors constituted by the pixels of the 00 and 01 quadrants, and the p, q, r, s, vectors constituted by the first, second, third and fourth components, respectively, of the initial vectors constituted by the pixels of the 10 and 11 quadrants. Precisely:

$$l = \begin{bmatrix} A_1[0]^{0,0} \\ A_3[0]^{0,0} \\ B_3[0]^{0,0} \\ B_1[0]^{0,0} \\ A_1[0]^{0,1} \\ A_3[0]^{0,1} \\ B_3[0]^{0,1} \\ B_1[0]^{0,1} \end{bmatrix}, m = \begin{bmatrix} A_1[1]^{0,0} \\ A_3[1]^{0,0} \\ B_3[1]^{0,0} \\ B_1[1]^{0,0} \\ A_1[1]^{0,1} \\ A_3[1]^{0,1} \\ B_3[1]^{0,1} \\ B_1[1]^{0,1} \end{bmatrix}, n = \begin{bmatrix} A_1[2]^{0,0} \\ A_3[2]^{0,0} \\ B_3[2]^{0,0} \\ B_1[2]^{0,0} \\ A_1[2]^{0,1} \\ A_3[2]^{0,1} \\ B_3[2]^{0,1} \\ B_1[2]^{0,1} \end{bmatrix}, o = \begin{bmatrix} A_1[3]^{0,0} \\ A_3[3]^{0,0} \\ B_3[3]^{0,0} \\ B_1[3]^{0,0} \\ A_1[3]^{0,1} \\ A_3[3]^{0,1} \\ B_3[3]^{0,1} \\ B_1[3]^{0,1} \end{bmatrix}$$

$$p = \begin{bmatrix} A_1[0]^{1,0} \\ A_3[0]^{1,0} \\ B_3[0]^{1,0} \\ B_1[0]^{1,0} \\ A_1[0]^{1,1} \\ A_3[0]^{1,1} \\ B_3[0]^{1,1} \\ B_1[0]^{1,1} \end{bmatrix}, p = \begin{bmatrix} A_1[1]^{1,0} \\ A_3[1]^{1,0} \\ B_3[1]^{1,0} \\ B_1[1]^{1,0} \\ A_1[1]^{1,1} \\ A_3[1]^{1,1} \\ B_3[1]^{1,1} \\ B_1[1]^{1,1} \end{bmatrix}, q = \begin{bmatrix} A_1[2]^{1,0} \\ A_3[2]^{1,0} \\ B_3[2]^{1,0} \\ B_1[2]^{1,0} \\ A_1[2]^{1,1} \\ A_3[2]^{1,1} \\ B_3[2]^{1,1} \\ B_1[2]^{1,1} \end{bmatrix}, s = \begin{bmatrix} A_1[3]^{1,0} \\ A_3[3]^{1,0} \\ B_3[3]^{1,0} \\ B_1[3]^{1,0} \\ A_1[3]^{1,1} \\ A_3[3]^{1,1} \\ B_3[3]^{1,1} \\ B_1[3]^{1,1} \end{bmatrix}$$

Figure 7:
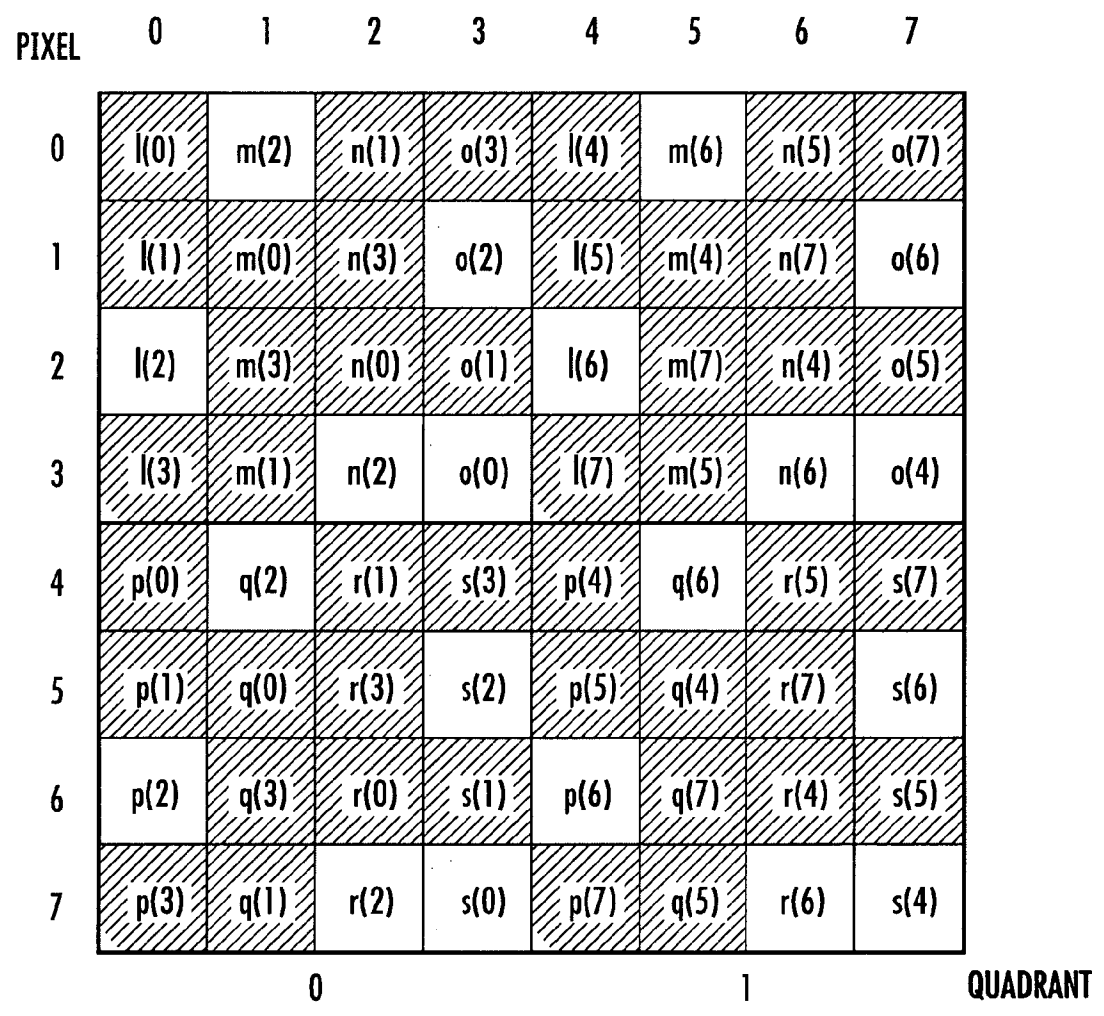

By taking into account the way in which the vectors $A_1^{i,j}$, $A_3^{i,j}$, $B_3^{i,j}$, $B_1^{i,j}$ are defined, the arrangement detailed in FIG. 7 is obtained. It should be noted that in this figure the original 8×8 block is subdivided in the four 4×4 quadrants, within each quadrant (i,j), the pixels belonging to the respective vectors $A_1^{i,j}$, $A_3^{i,j}$, $B_3^{i,j}$, $B_1^{i,j}$ have different shadings in the figure.

According to what has been described above, the computation of a 4×4 DCT may be subdivided in two stages: consequently, the PROCESS phase that is the only phase in which arithmetical operations are performed, is done twice:

a first time, to compute in parallel the sixteen 1-D DCTs;

a second time, to compute in parallel four 4×4 DCT starting from the coefficients of the 1-D DCTs.

The variable stage indicates whether the first or second calculation stage is being performed.

During the INPUT phase the variable stage is updated to the value 0.

At the input in the PROCESS phase, there are 64 input MUXes that are controlled by the variable stage. Each MUX receives two inputs:

a pixel of the original picture, coming from the INPUT phase (this input is selected when stage=0);

a coefficient of a 1-D DCT, coming from the ORDER phase (this input is selected when stage=1).

PROCESS Phase

Figure 8:
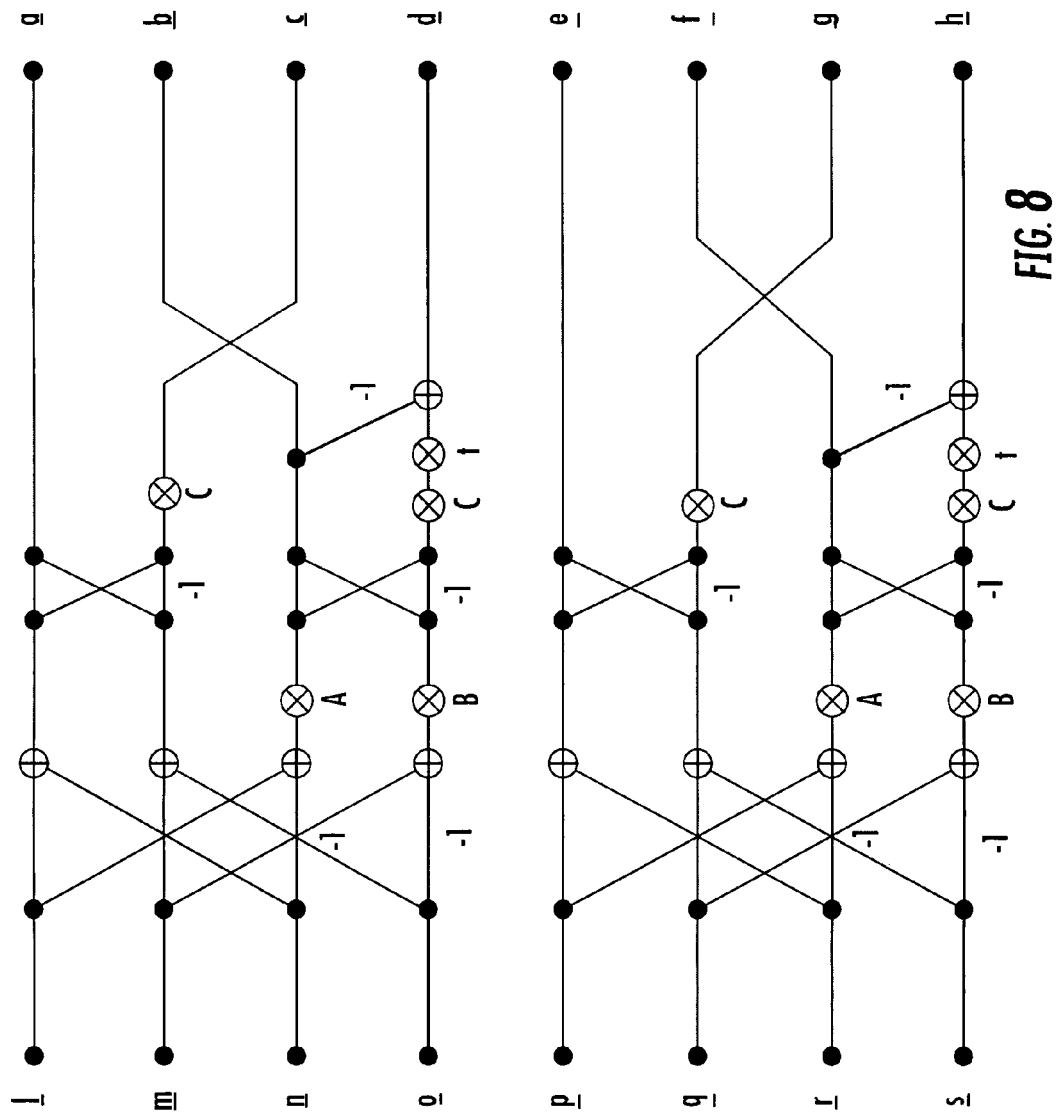
FIG. 8 shows the PROCESS phase of the calculating procedure of four 4×4 DCTs.

This phase includes processing the l, m, . . . , s vectors as shown in FIG. 8. In this figure the following symbols are used:

$$A = \begin{cases} 2C_8^1 \times I_{8 \times 8} & \text{per stage} = 0 \\ \begin{bmatrix} (H_1)_4 & 0 \\ 0 & (H_1)_4 \end{bmatrix} & \text{per stage} = 1 \end{cases} \quad (11)$$

$$B = \begin{cases} 2C_8^3 \times I_{8 \times 8} & \text{per stage} = 0 \\ \begin{bmatrix} -(H_3)_4 & 0 \\ 0 & -(H_3)_4 \end{bmatrix} & \text{per stage} = 1 \end{cases} \quad (12)$$

$$C = \begin{cases} 2C_4^1 \times I_{8 \times 8} & \text{per stage} = 0 \\ \begin{bmatrix} (H_2)_4 & 0 \\ 0 & (H_2)_4 \end{bmatrix} & \text{per stage} = 1 \end{cases} \quad (13)$$

$$t = \begin{cases} 1 & \text{per stage} = 0 \\ 2 & \text{per stage} = 1 \end{cases} \quad (14)$$

At the output of the PROCESS structure there are 64 DEMUXes controlled by the variable stage. The DEMUX address the data according to two conditions:

if stage=0, the input datum to each DEMUX is a coefficient of a 1-D DCT; therefore the datum must be further processed and, for this purpose, is conveyed to the ORDER phase;

if stage=1, the input datum to each DEMUX is a coefficient of a 2-D DCT; therefore the datum must not be processed further and therefore is conveyed to the OUTPUT phase.

ORDER Phase

The ORDER phase includes arranging the output sequence of the eight 1-D DCTs in eight l', m', . . . , s' vectors, thus defined:

$$l' = \begin{bmatrix} f_0^{0,0} \\ f_0^{0,1} \end{bmatrix} = \begin{bmatrix} a[0] \\ b[0] \\ c[0] \\ d[0] \\ a[4] \\ b[4] \\ c[4] \\ d[4] \end{bmatrix}, m' = \begin{bmatrix} f_1^{0,0} \\ f_1^{0,1} \end{bmatrix} = \begin{bmatrix} a[1] \\ b[1] \\ c[1] \\ d[1] \\ a[5] \\ b[5] \\ c[5] \\ d[5] \end{bmatrix},$$

$$n' = \begin{bmatrix} f_2^{0,0} \\ f_2^{0,1} \end{bmatrix} = \begin{bmatrix} a[2] \\ b[2] \\ c[2] \\ d[2] \\ a[6] \\ b[6] \\ c[6] \\ d[6] \end{bmatrix}, o' = \begin{bmatrix} f_3^{0,0} \\ f_3^{0,1} \end{bmatrix} = \begin{bmatrix} a[3] \\ b[3] \\ c[3] \\ d[3] \\ a[7] \\ b[7] \\ c[7] \\ d[7] \end{bmatrix},$$

-continued $$p' = \begin{bmatrix} f_0^{1,0} \\ f_0^{1,1} \end{bmatrix} = \begin{bmatrix} e[0] \\ f[0] \\ g[0] \\ h[0] \\ e[4] \\ f[4] \\ g[4] \\ h[4] \end{bmatrix}, q' = \begin{bmatrix} f_1^{1,0} \\ f_1^{1,1} \end{bmatrix} = \begin{bmatrix} e[1] \\ f[1] \\ g[1] \\ h[1] \\ e[5] \\ f[5] \\ g[5] \\ h[5] \end{bmatrix},$$

$$r' = \begin{bmatrix} f_2^{1,0} \\ f_2^{1,1} \end{bmatrix} = \begin{bmatrix} e[2] \\ f[2] \\ g[2] \\ h[2] \\ e[6] \\ f[6] \\ g[6] \\ h[6] \end{bmatrix}, s' = \begin{bmatrix} f_3^{1,0} \\ f_3^{1,1} \end{bmatrix} = \begin{bmatrix} e[3] \\ f[3] \\ g[3] \\ h[3] \\ e[7] \\ f[7] \\ g[7] \\ h[7] \end{bmatrix},$$

After the ORDER phase the variable stage is updated to the value 1. The output data from the ORDER phase are sent to the PROCESS phase.

OUTPUT Phase

This phase includes rearranging the data originating from the second (stage=1) execution of the PROCESS step: starting from these data, which constitute the eight-component vectors: a, b, . . . , h, the output block $Y_{N*N}$ is thus defined:

$$\begin{bmatrix} y[0] & y[1] & \ldots & y[7] \\ \vdots & \vdots & \vdots & \vdots \\ y[54] & y[55] & \ldots & y[63] \end{bmatrix} = \tag{15}$$

$$\begin{bmatrix} a[0] & b[0] & c[0] & d[0] & e[0] & f[0] & g[0] & h[0] \\ \vdots & \vdots & \vdots & \vdots & \vdots & \vdots & \vdots & \vdots \\ a[3] & b[3] & c[3] & d[3] & e[3] & f[3] & g[3] & h[3] \\ e[4] & f[4] & g[4] & h[4] & a[4] & b[4] & c[4] & d[4] \\ \vdots & \vdots & \vdots & \vdots & \vdots & \vdots & \vdots & \vdots \\ e[7] & f[7] & g[7] & h[7] & a[7] & b[7] & c[7] & d[7] \end{bmatrix}$$

The main differences between the hardware for calculating the four 4×4 DCTs and the hardware needed for the sixteen 2×2 DCTs are the following:

- the ordering sequences of the pixels of the block of the original picture depend on the chosen DCT size;
- to execute the sixteen 2×2 DCTs the PROCESS step must be carried out only once; instead, to execute the four 4×4 DCTs the PROCESS step must be repeated two times;
- the operations executed during the PROCESS phase are not always the same for the two cases.

Computation of an 8×8 DCT

For N=8 equation (5) becomes:

$$y_{m,n} = \sum_{i=0}^{7} \sum_{j=0}^{7} x_{i,j} \cos\left[\frac{(2i+1)m}{16}\pi\right] \cos\left[\frac{(2j+1)n}{16}\pi\right] \tag{16}$$

Putting:

$$Y_{64\times 1} = \begin{bmatrix} y_0 \\ y_1 \\ \vdots \\ y_7 \end{bmatrix}, F_{64\times 1} = \begin{bmatrix} f_0 \\ f_1 \\ \vdots \\ f_7 \end{bmatrix}$$

where:

$y_i = [y_{i,0} \; y_{i,1} \; \cdots \; y_{i,7}]$ $\{f_{0,r}\}_{r=0}^{7} = DCT(\{A_{1,i}\}_{i=0}^{7}), \{f_{4,r}\}_{r=0}^{7} = DCT(\{B_{7,i}\}_{i=0}^{7}),$
$\{f_{1,r}\}_{r=0}^{7} = DCT(\{A_{3,i}\}_{i=0}^{7}), \{f_{5,r}\}_{r=0}^{7} = DCT(\{B_{5,i}\}_{i=0}^{7}),$
$\{f_{2,r}\}_{r=0}^{7} = DCT(\{A_{5,i}\}_{i=0}^{7}), \{f_{6,r}\}_{r=0}^{7} = DCT(\{B_{3,i}\}_{i=0}^{7}),$
$\{f_{3,r}\}_{r=0}^{7} = DCT(\{A_{7,i}\}_{i=0}^{7}), \{f_{7,r}\}_{r=0}^{7} = DCT(\{B_{1,i}\}_{i=0}^{7},$ $\{A_{1,i}\}_{i=0}^{7} = \{x_{0,0} \; x_{1,1} \; x_{2,2} \; x_{3,3} \; x_{4,4} \; x_{5,5} \; x_{6,6} \; x_{7,7},$
$\{A_{3,i}\}_{i=0}^{7} = \{x_{1,0} \; x_{4,1} \; x_{7,2} \; x_{5,3} \; x_{2,4} \; x_{0,5} \; x_{3,6} \; x_{6,7},$
$\{A_{5,i}\}_{i=0}^{7} = \{x_{2,0} \; x_{7,1} \; x_{3,2} \; x_{1,3} \; x_{6,4} \; x_{4,5} \; x_{0,6} \; x_{5,7},$
$\{A_{7,i}\}_{i=0}^{7} = \{x_{3,0} \; x_{5,1} \; x_{1,2} \; x_{7,3} \; x_{0,4} \; x_{6,5} \; x_{2,6} \; x_{4,7},$
$\{B_{7,i}\}_{i=0}^{7} = \{x_{4,0} \; x_{2,1} \; x_{6,2} \; x_{0,3} \; x_{7,4} \; x_{1,5} \; x_{5,6} \; x_{3,7},$
$\{B_{5,i}\}_{i=0}^{7} = \{x_{5,0} \; x_{0,1} \; x_{4,2} \; x_{6,3} \; x_{1,4} \; x_{3,5} \; x_{7,6} \; x_{2,7}\},$
$\{B_{3,i}\}_{i=0}^{7} = \{x_{6,0} \; x_{3,1} \; x_{0,2} \; x_{2,3} \; x_{5,4} \; x_{7,5} \; x_{4,6} \; x_{1,7}\},$
$\{B_{1,i}\}_{i=0}^{7} = \{x_{7,0} \; x_{6,1} \; x_{5,2} \; x_{4,3} \; x_{3,4} \; x_{2,5} \; x_{1,6} \; x_{0,7}\}$ it may be demonstrated that:

$$Y_{64\times 1} = (E_8)_{64} F_{64\times 1} \tag{17}$$

where:

$$(E_8)_{64} = \tag{18}$$

$$\begin{bmatrix} (H_0)_8 & (H_0)_8 & (H_0)_8 & (H_0)_8 & (H_0)_8 & (H_0)_8 & (H_0)_8 & (H_0)_8 \\ (H_1)_8 & (H_3)_8 & (H_5)_8 & (H_7)_8 & -(H_7)_8 & -(H_5)_8 & -(H_3)_8 & -(H_1)_8 \\ (H_2)_8 & (H_6)_8 & -(H_6)_8 & -(H_2)_8 & -(H_2)_8 & -(H_6)_8 & (H_6)_8 & (H_2)_8 \\ (H_3)_8 & -(H_7)_8 & -(H_1)_8 & -(H_5)_8 & (H_5)_8 & (H_1)_8 & (H_7)_8 & -(H_3)_8 \\ (H_4)_8 & -(H_4)_8 & -(H_4)_8 & (H_4)_8 & (H_4)_8 & -(H_4)_8 & -(H_4)_8 & (H_4)_8 \\ (H_5)_8 & -(H_1)_8 & (H_7)_8 & (H_3)_8 & -(H_3)_8 & -(H_7)_8 & (H_1)_8 & -(H_5)_8 \\ (H_6)_8 & -(H_2)_8 & (H_2)_8 & -(H_6)_8 & -(H_6)_8 & (H_2)_8 & -(H_2)_8 & (H_6)_8 \\ (H_7)_8 & -(H_5)_8 & (H_3)_8 & -(H_1)_8 & (H_1)_8 & -(H_3)_8 & (H_5)_8 & -(H_7)_8 \end{bmatrix}$$

the matrices (Hi)s i=0, 1, . . . , 7 have the f following expressions:

$$(H_0)_8 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix},$$

$$(H_1)_8 = \begin{bmatrix} 0 & 1 & 0 & 0 & 0 & 0 & 0 & 0 \\ \frac{1}{2} & 0 & \frac{1}{2} & 0 & 0 & 0 & 0 & 0 \\ 0 & \frac{1}{2} & 0 & \frac{1}{2} & 0 & 0 & 0 & 0 \\ 0 & 0 & \frac{1}{2} & 0 & \frac{1}{2} & 0 & 0 & 0 \\ 0 & 0 & 0 & \frac{1}{2} & 0 & \frac{1}{2} & 0 & 0 \\ 0 & 0 & 0 & 0 & \frac{1}{2} & 0 & \frac{1}{2} & 0 \\ 0 & 0 & 0 & 0 & 0 & \frac{1}{2} & 0 & \frac{1}{2} \\ 0 & 0 & 0 & 0 & 0 & 0 & \frac{1}{2} & 0 \end{bmatrix},$$

$$(H_2)_8 = \begin{bmatrix} 0 & 0 & 1 & 0 & 0 & 0 & 0 & 0 \\ 0 & \frac{1}{2} & 0 & \frac{1}{2} & 0 & 0 & 0 & 0 \\ \frac{1}{2} & 0 & 0 & 0 & \frac{1}{2} & 0 & 0 & 0 \\ 0 & \frac{1}{2} & 0 & 0 & 0 & \frac{1}{2} & 0 & 0 \\ 0 & 0 & \frac{1}{2} & 0 & 0 & 0 & \frac{1}{2} & 0 \\ 0 & 0 & 0 & \frac{1}{2} & 0 & 0 & 0 & \frac{1}{2} \\ 0 & 0 & 0 & 0 & \frac{1}{2} & 0 & 0 & 0 \\ 0 & 0 & 0 & 0 & 0 & \frac{1}{2} & 0 & -\frac{1}{2} \end{bmatrix},$$

$$(H_3)_8 = \begin{bmatrix} 0 & 0 & 0 & 1 & 0 & 0 & 0 & 0 \\ 0 & 0 & \frac{1}{2} & 0 & \frac{1}{2} & 0 & 0 & 0 \\ 0 & \frac{1}{2} & 0 & 0 & 0 & \frac{1}{2} & 0 & 0 \\ \frac{1}{2} & 0 & 0 & 0 & 0 & 0 & \frac{1}{2} & 0 \\ 0 & \frac{1}{2} & 0 & 0 & 0 & 0 & 0 & \frac{1}{2} \\ 0 & 0 & \frac{1}{2} & 0 & 0 & 0 & 0 & 0 \\ 0 & 0 & 0 & \frac{1}{2} & 0 & 0 & 0 & -\frac{1}{2} \\ 0 & 0 & 0 & 0 & \frac{1}{2} & 0 & -\frac{1}{2} & 0 \end{bmatrix},$$

$$(H_4)_8 = \begin{bmatrix} 0 & 0 & 0 & 0 & 1 & 0 & 0 & 0 \\ 0 & 0 & 0 & \frac{1}{2} & 0 & \frac{1}{2} & 0 & 0 \\ 0 & 0 & \frac{1}{2} & 0 & 0 & 0 & \frac{1}{2} & 0 \\ 0 & \frac{1}{2} & 0 & 0 & 0 & 0 & 0 & \frac{1}{2} \\ \frac{1}{2} & 0 & 0 & 0 & 0 & 0 & 0 & 0 \\ 0 & \frac{1}{2} & 0 & 0 & 0 & 0 & 0 & -\frac{1}{2} \\ 0 & 0 & \frac{1}{2} & 0 & 0 & 0 & -\frac{1}{2} & 0 \\ 0 & 0 & 0 & \frac{1}{2} & 0 & -\frac{1}{2} & 0 & 0 \end{bmatrix},$$

$$(H_5)_8 = \begin{bmatrix} 0 & 0 & 0 & 0 & 0 & 1 & 0 & 0 \\ 0 & 0 & 0 & 0 & \frac{1}{2} & 0 & \frac{1}{2} & 0 \\ 0 & 0 & 0 & \frac{1}{2} & 0 & 0 & 0 & \frac{1}{2} \\ 0 & 0 & \frac{1}{2} & 0 & 0 & 0 & 0 & 0 \\ 0 & \frac{1}{2} & 0 & 0 & 0 & 0 & 0 & -\frac{1}{2} \\ \frac{1}{2} & 0 & 0 & 0 & 0 & 0 & -\frac{1}{2} & 0 \\ 0 & \frac{1}{2} & 0 & 0 & 0 & -\frac{1}{2} & 0 & 0 \\ 0 & 0 & \frac{1}{2} & 0 & -\frac{1}{2} & 0 & 0 & 0 \end{bmatrix},$$

$$(H_6)_8 = \begin{bmatrix} 0 & 0 & 0 & 0 & 0 & 0 & 1 & 0 \\ 0 & 0 & 0 & 0 & 0 & \frac{1}{2} & 0 & \frac{1}{2} \\ 0 & 0 & 0 & 0 & \frac{1}{2} & 0 & 0 & 0 \\ 0 & 0 & 0 & \frac{1}{2} & 0 & 0 & 0 & -\frac{1}{2} \\ 0 & 0 & \frac{1}{2} & 0 & 0 & 0 & -\frac{1}{2} & 0 \\ 0 & \frac{1}{2} & 0 & 0 & 0 & -\frac{1}{2} & 0 & 0 \\ \frac{1}{2} & 0 & 0 & 0 & -\frac{1}{2} & 0 & 0 & 0 \\ 0 & -\frac{1}{2} & 0 & -\frac{1}{2} & 0 & 0 & 0 & 0 \end{bmatrix},$$

$$(H_7)_8 = \begin{bmatrix} 0 & 0 & 0 & 0 & 0 & 0 & 0 & 1 \\ 0 & 0 & 0 & 0 & 0 & 0 & \frac{1}{2} & 0 \\ 0 & 0 & 0 & 0 & 0 & \frac{1}{2} & 0 & -\frac{1}{2} \\ 0 & 0 & 0 & 0 & \frac{1}{2} & 0 & -\frac{1}{2} & 0 \\ 0 & 0 & 0 & \frac{1}{2} & 0 & -\frac{1}{2} & 0 & 0 \\ 0 & 0 & \frac{1}{2} & 0 & -\frac{1}{2} & 0 & 0 & 0 \\ 0 & \frac{1}{2} & 0 & -\frac{1}{2} & 0 & 0 & 0 & 0 \\ \frac{1}{2} & 0 & -\frac{1}{2} & 0 & 0 & 0 & 0 & 0 \end{bmatrix}$$

The 1-D DCT is expressed by the matrix:

$$(1 - DDCT)_8 = C_8 = \begin{bmatrix} 1 & 1 & 1 & 1 & 1 & 1 & 1 & 1 \\ C_{16}^1 & C_{16}^3 & C_{16}^5 & C_{16}^7 & -C_{16}^7 & -C_{16}^5 & -C_{16}^3 & -C_{16}^1 \\ C_8^3 & C_8^3 & C_8^5 & C_8^7 & C_8^7 & C_8^5 & C_8^3 & C_8^1 \\ C_{16}^3 & -C_{16}^7 & -C_{16}^1 & -C_{16}^5 & C_{16}^5 & C_{16}^1 & C_{16}^7 & -C_{16}^3 \\ C_4^1 & -C_4^1 & -C_4^1 & C_4^1 & C_4^1 & -C_4^1 & -C_4^1 & C_4^1 \\ C_{16}^5 & -C_{16}^1 & C_{16}^7 & C_{16}^3 & -C_{16}^3 & -C_{16}^7 & C_{16}^1 & -C_{16}^5 \\ C_8^3 & -C_8^3 & C_8^5 & C_8^5 & C_8^5 & C_8^5 & C_8^3 & C_8^3 \\ C_{16}^7 & -C_{16}^5 & C_{16}^3 & -C_{16}^1 & C_{16}^1 & -C_{16}^3 & C_{16}^5 & -C_{16}^7 \end{bmatrix}$$

Where we put:

$$C_n^m = \cos\left(\frac{m}{n}\pi\right)$$

From the above equations it is evident that the computation of an 8×8 DCT may be subdivided in two stages:
- calculating eight 1-D DCTs, each for a certain sequence of eight pixels;
- calculating the 2-D DCT, starting from the eight 1-D DCTs.

Figure 9:
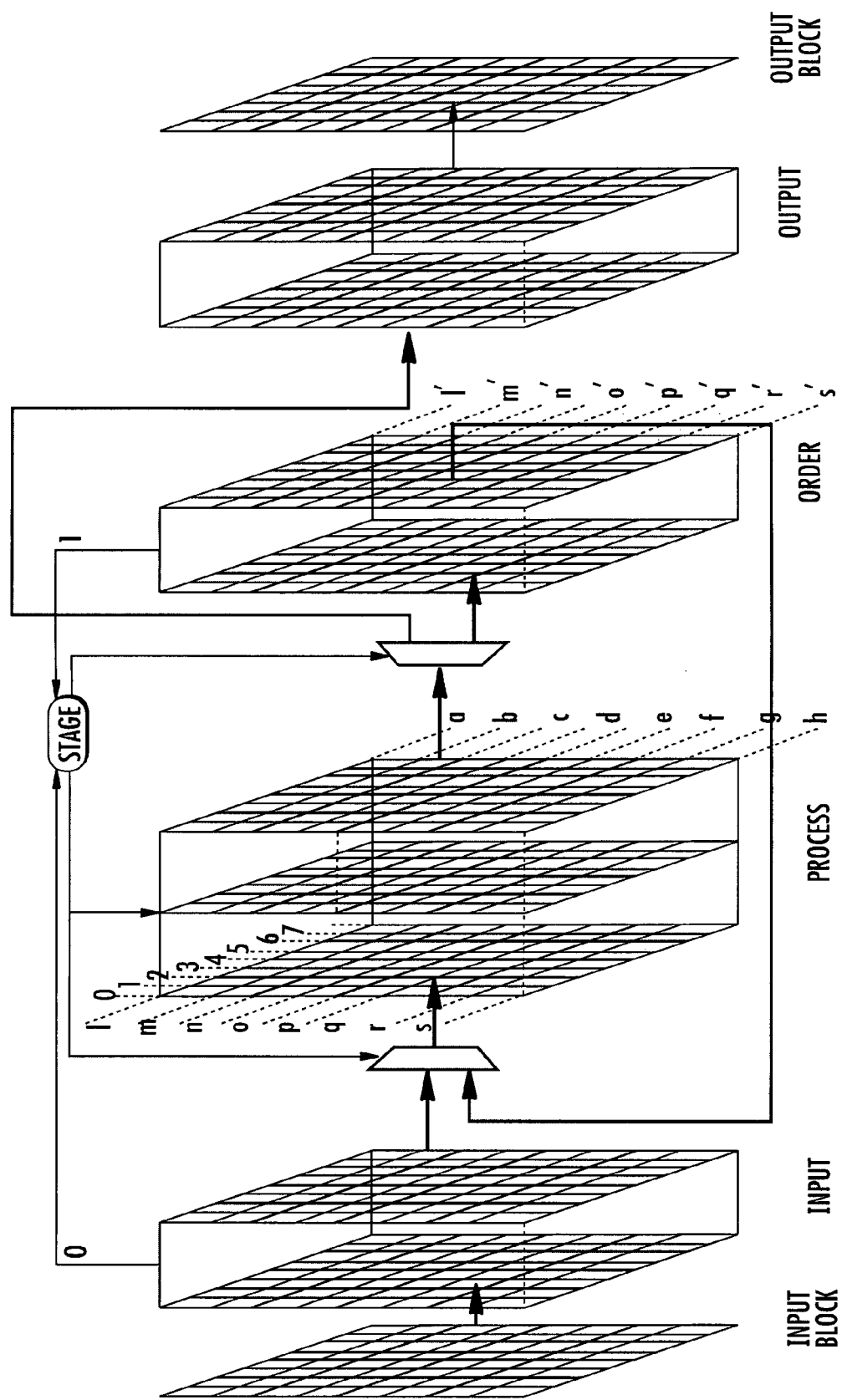
FIG. 9 illustrates the architecture for parallel computation of an 8×8 DCT.

These two stages may be executed through the same hardware using it twice. The processing is subdivided in different steps, to each of which corresponds an architectural block. A whole view of the hardware is shown in FIG. 9.

INPUT Phase

The pixels of the 8×8 input block are ordered to constitute the eight-component vectors l, m, n, o, p, q, r, s:

$$l = \begin{bmatrix} A_1[0] \\ A_3[0] \\ A_5[0] \\ A_7[0] \\ B_7[0] \\ B_5[0] \\ B_3[0] \\ B_1[0] \end{bmatrix}, m = \begin{bmatrix} A_1[1] \\ A_3[1] \\ A_5[1] \\ A_7[1] \\ B_7[1] \\ B_5[1] \\ B_3[1] \\ B_1[1] \end{bmatrix}, \ldots, s = \begin{bmatrix} A_1[7] \\ A_3[7] \\ A_5[7] \\ A_7[7] \\ B_7[7] \\ B_5[7] \\ B_3[7] \\ B_1[7] \end{bmatrix}$$

By taking into account the way in which the vectors $A_1$, $A_3$, $A_5$, $A_7$, $B_7$, $B_5$, $B_3$, $B_1$ are defined, we obtain the detailed arrangement of FIG. 10. It should be noticed that in this figure the pixels belonging to the vectors $A_1$, $A_3$, $A_5$, $A_7$, $B_7$, $B_5$, $B_3$, $B_1$ are countersigned by different shadings.

As shown above, the computation of an 8×8 DCT may be subdivided into two stage. The PROCESS step, which is the only phase in which mathematical operations are performed, is performed twice:
- the first time, to compute in parallel sixteen 1-D DCTs;
- the second time, to compute the 8×8 DCT starting from the coefficients of the sixteen 1-D DCTs.

The variable stage indicates whether the first or second calculation step is being performed. During the INPUT phase, the variable stage is updated to the value 0.

At the input of the PROCESS structure, there are 64 MUXes controlled by the variable stage. Each MUX receives two inputs:

a pixel of the original picture, originating from the INPUT phase (this input is selected when stage=0);

a coefficient of a 1-D DCT, originating from the ORDER phase (this input is selected when stage=1).

PROCESS Phase

Figure 11:
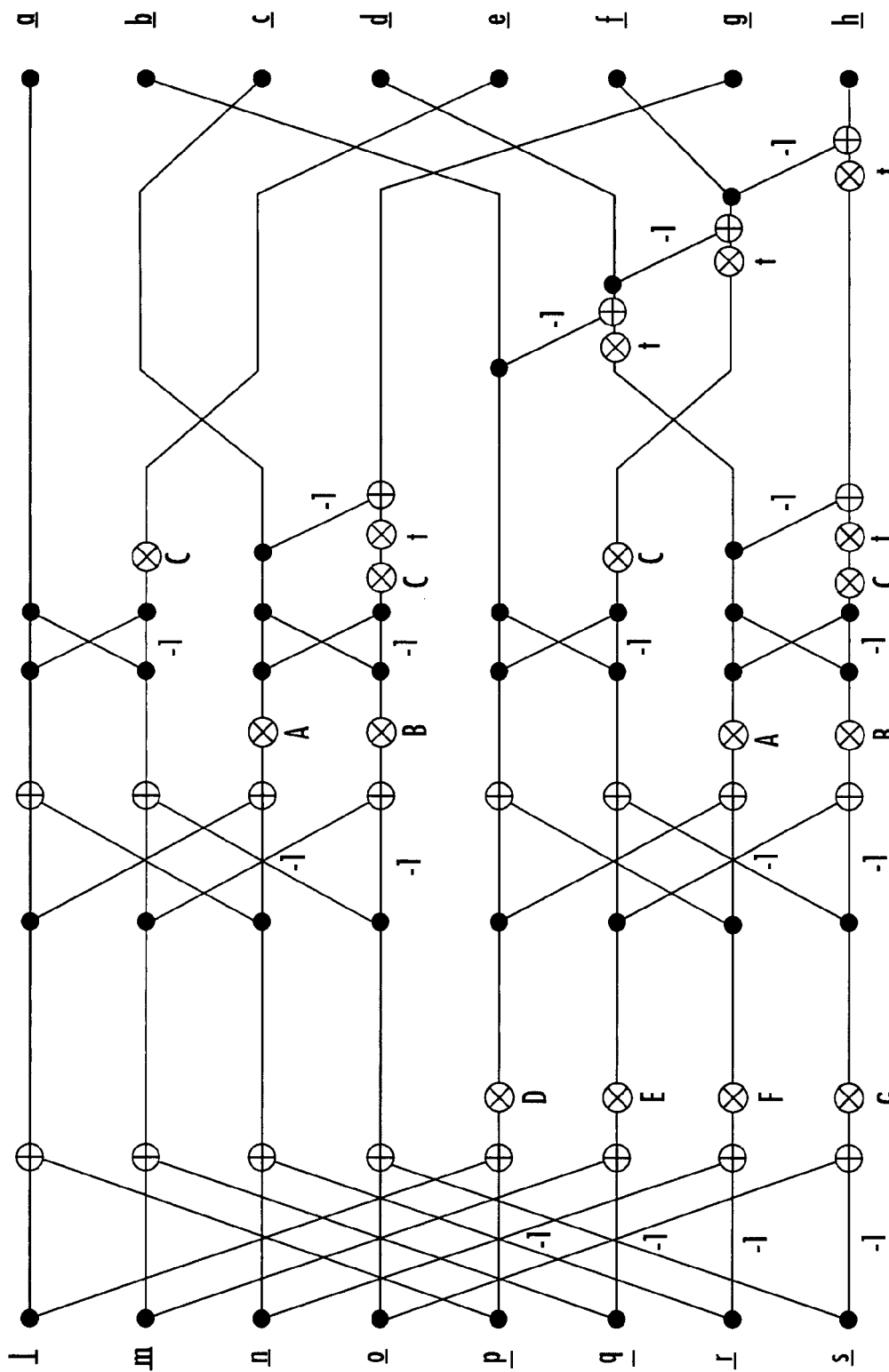
FIG. 11 shows the PROCESS phase for the calculating procedure of an 8×8 DCT.

This phase includes processing the l, m, . . . , s vectors as shown in FIG. 11. In this figure, the following symbols are used:

$$A = \begin{cases} 2C_8^1 \times I_{8\times 8} & \text{per stage} = 0 \\ (H_2)_8 & \text{per stage} = 1 \end{cases} \quad (19)$$

$$B = \begin{cases} 2C_8^3 \times I_{8\times 8} & \text{per stage} = 0 \\ -(H_6)_8 & \text{per stage} = 1 \end{cases} \quad (20)$$

$$C = \begin{cases} 2C_4^1 \times I_{8\times 8} & \text{per stage} = 0 \\ (H_4)_8 & \text{per stage} = 1 \end{cases} \quad (21)$$

$$t = \begin{cases} 1 & \text{per stage} = 0 \\ 2 & \text{per stage} = 1 \end{cases} \quad (22)$$

At the output of the PROCESS structure there are 64 DEMUXes controlled by the variable stage. The DEMUXes address the data according to two possibilities:

if stage=0, the input datum to each DEMUX is a coefficient of a 1-D DCT; therefore, the datum must be further processed and, for this purpose, is sent to the ORDER phase;

if stage=1, the input datum to each DEMUX is a coefficient of a 2-D DCT; therefore, the datum does not need any further processing and therefore is sent to the OUTPUT phase.

ORDER Phase

This phase includes arranging the output sequence of the eight 1-D DCTs in eight l', m', . . . , s' vectors, thus defined:

$$l' = f_0 = \begin{bmatrix} a[0] \\ b[0] \\ c[0] \\ d[0] \\ e[0] \\ f[0] \\ g[0] \\ h[0] \end{bmatrix}, m' = f_1 = \begin{bmatrix} a[1] \\ b[1] \\ c[1] \\ d[1] \\ e[1] \\ f[1] \\ g[1] \\ h[1] \end{bmatrix}, \ldots, q' = f_7 = \begin{bmatrix} a[7] \\ b[7] \\ c[7] \\ d[7] \\ e[7] \\ f[7] \\ g[7] \\ h[7] \end{bmatrix}$$

Following the ORDER phase the variable stage is updated to the value 1. The output data from the ORDER phase are sent to the PROCESS phase.

OUTPUT Phase

This phase includes rearranging the data originating from the second execution of the PROCESS step (that is, with stage=1): starting from these data, which constitute the eight-component vectors a, b, . . . , h, the output block $Y_{N*N}$ defined as follows is constituted:

$$\begin{bmatrix} y[0] & y[1] & \cdots & y[7] \\ \vdots & \vdots & \vdots & \vdots \\ y[54] & y[55] & \vdots & y[63] \end{bmatrix} = \begin{bmatrix} a[0] & b[0] & c[0] & d[0] & e[0] & f[0] & g[0] & h[0] \\ \vdots & \vdots & \vdots & \vdots & \vdots & \vdots & \vdots & \vdots \\ a[7] & b[7] & c[7] & d[7] & e[7] & f[7] & g[7] & h[7] \end{bmatrix} \quad (23)$$

The main differences between the hardware that calculates an 8×8 DCT and the hardware that calculates the four 4×4 DCTs are:
- the sequences into which must be arranged the pixels of a block of the original picture depend on the chosen size of the DCT;
- the operations executed during the PROCESS step are not always the same for the two cases.

Procedure for Calculating the DCT for Blocks of Scaleable Size (8×8 DCTs, 4×4 DCTs and 2×2 DCTs)

From the above described procedures, an algorithm for calculating a chosen one of 8×8 DCT of four 4×4 DCTs (in parallel) or sixteen 2×2 DCTs (in parallel) may be derived. The selection is made by the user by assigning a certain value to the global variable size:

$$\text{size} = \begin{cases} 0 & \text{for an } 8 \times 8 \text{ } DCT \\ 1 & \text{for four } DCTs \\ 2 & \text{for sixteen } 2 \times 2 \text{ } DCTs \end{cases}$$

Figure 12:
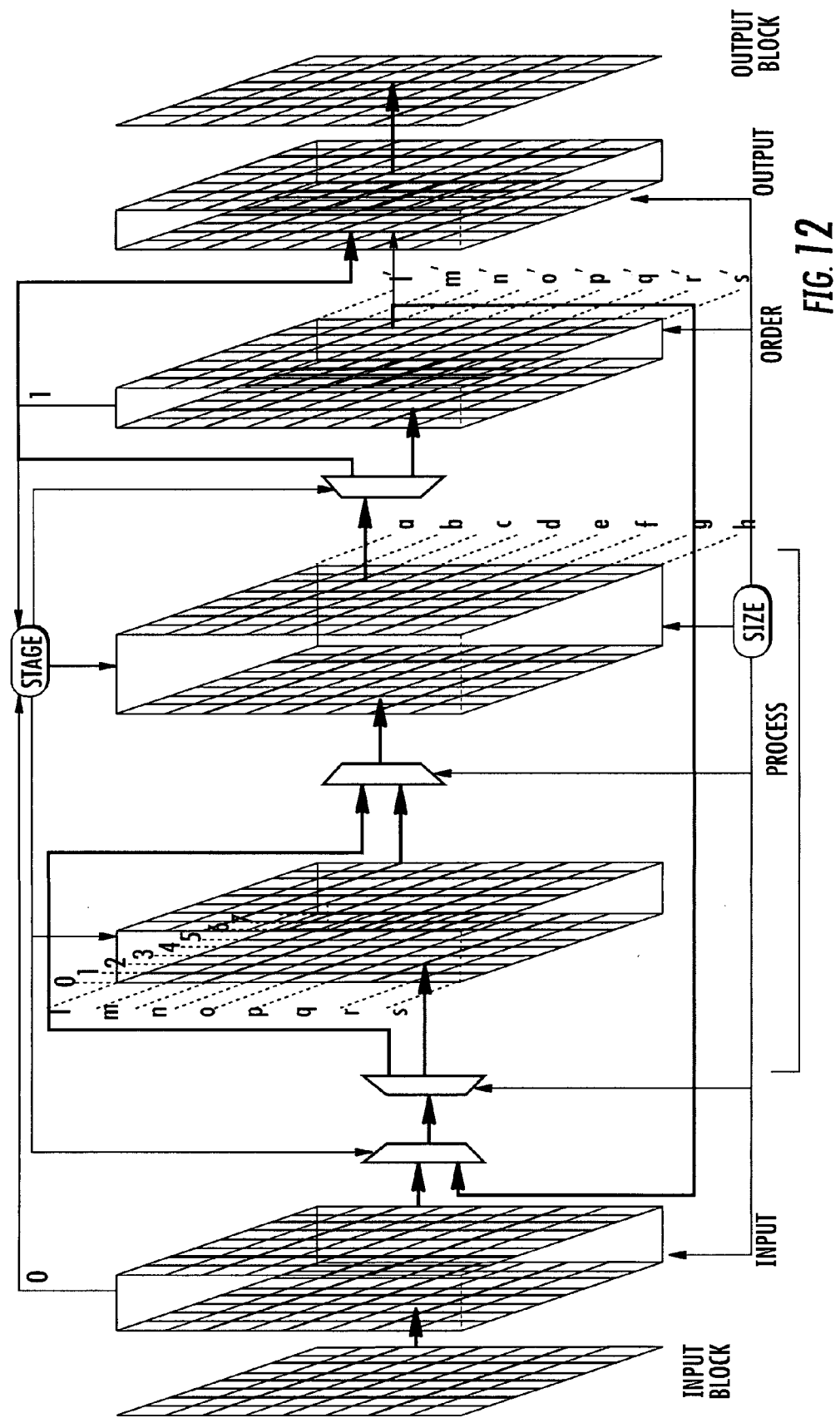
FIG. 12 shows the scaleable hardware architecture of the invention for calculating an 8×8 DCT or four 4×4 DCTs in parallel or sixteen 2×2 DCTs in parallel.

The procedure is subdivided in various phases (regardless of the value of the variable size), to each of which corresponds an architectural block. A whole view is shown in FIG. 12. Each phase has been organized in order to provide for partial results corresponding to the chosen value, minimizing redundancies. Sometimes the operations performed are different depending on the value of size. In these cases, the architecture considers a MUX whose control input is size. Let us examine now the various phases and highlight the differences in respect to the architectures that have already been described above:

INPUT Phase

Figure 13:
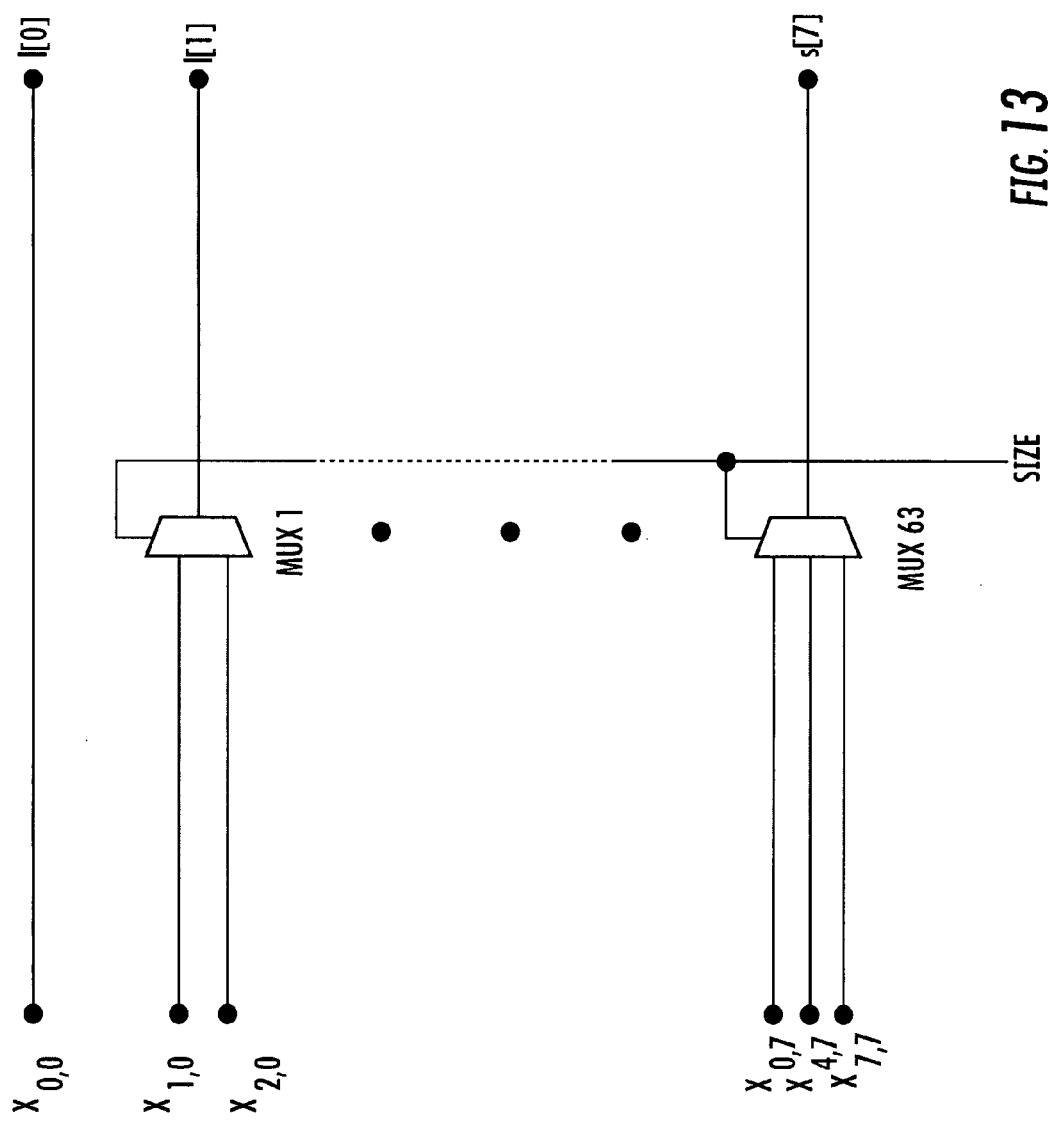
FIG. 13 shows the INPUT structure of the scaleable architecture of the invention.

The object of this phase, depicted in FIG. 13, is to arrange the data to allow the computation starting from the arranged data of the 1-D DCTs. This is done by inputting the luminance values of the pixels (8×8 matrix) and arranging them in eight-component vectors l, m, . . . , s.

For example:

$$l[0] = x_{0,0}$$

$$l[1] = \begin{cases} x_{1,2} & \text{per size} = 0 \text{ or } 1 \\ x_{2,0} & \text{per size} = 2 \end{cases}$$

$$s[7] = \begin{cases} x_{0,7} & \text{per size} = 0 \\ x_{4,7} & \text{per size} = 1 \\ x_{7,7} & \text{per size} = 2 \end{cases}$$

PROCESS Phase with Stage=0

Figure 14:
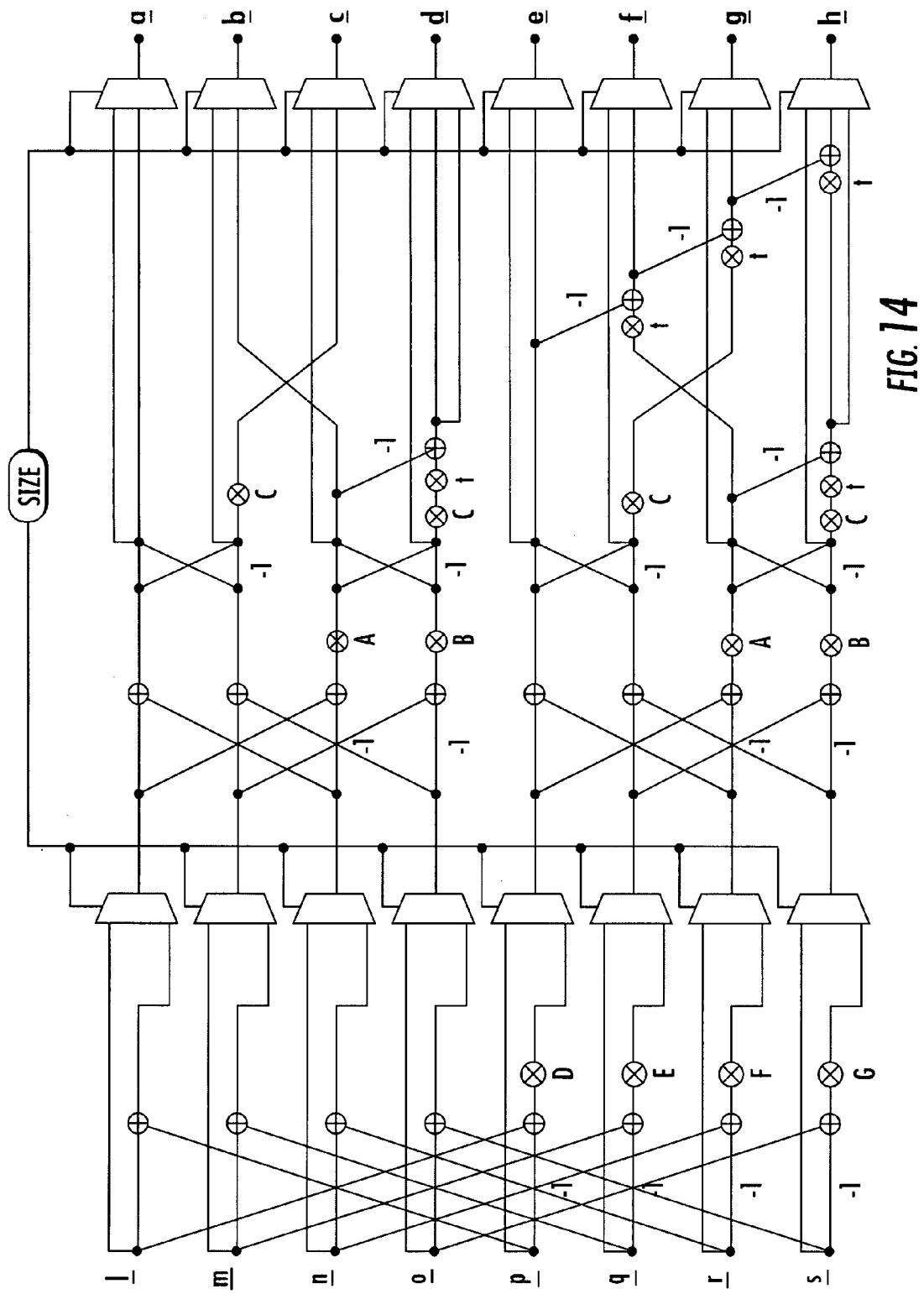
FIG. 14 shows the PROCESS structure for the scaleable architecture of the invention.

This phase includes calculating in parallel the eight 1-D DCTs by processing the vectors l, m, . . . , s as shown in FIG. 14. In this figure may be observed the use of 16 MUXes controlled by the variable size. The eight MUXes on the left serve to bypass the operations required for the computation of the 8×8 DCT. Thus, the bypass occurs when size=1 or 2, while it does not occur for size=0. The eight MUXes on the right serve to output only the result that corresponds to the pre-selected value of size.

$$t = \begin{cases} 1 & \text{per stage} = 0 \\ 2 & \text{per stage} = 1 \end{cases} \quad (24)$$

$$A = \begin{cases} 2C_8^1 \times I_{8 \times 8} & \text{per stage, size} = (0, 0) \text{ or } (0, 1) \\ I_{8 \times 8} & \text{per stage, size} = (0, 2) \text{ or } (1, 2) \\ (H_2)_8 & \text{per stage, size} = (1, 0) \\ \begin{bmatrix} (H_1)_4 & 0 \\ 0 & (H_1)_4 \end{bmatrix} & \text{per stage, size} = (1, 1) \end{cases} \quad (25)$$

$$B = \begin{cases} 2C_8^3 \times I_{8 \times 8} & \text{per stage, size} = (0, 0) \text{ or } (0, 1) \\ I_{8 \times 8} & \text{per stage, size} = (0, 2) \text{ or } (1, 2) \\ -(H_6)_8 & \text{per stage, size} = (1, 0) \\ \begin{bmatrix} -(H_3)_4 & 0 \\ 0 & -(H_3)_4 \end{bmatrix} & \text{per stage, size} = (1, 1) \end{cases} \quad (26)$$

$$C = \begin{cases} 2C_4^1 \times I_{8 \times 8} & \text{per stage, size} = (0, 0) \text{ or } (0, 1) \\ I_{8 \times 8} & \text{per stage, size} = (0, 2) \text{ or } (1, 2) \\ (H_4)_8 & \text{per stage, size} = (1, 0) \\ \begin{bmatrix} (H_2)_4 & 0 \\ 0 & (H_2)_4 \end{bmatrix} & \text{per stage, size} = (1, 1) \end{cases} \quad (27)$$

$$D = \begin{cases} 2C_{16}^1 \times I_{8 \times 8} & \text{per stage} = 0 \\ (H_1)_8 & \text{per stage} = 1 \end{cases} \quad (28)$$

$$E = \begin{cases} 2C_8^3 \times I_{8 \times 8} & \text{per stage} = 0 \\ (H_5)_8 & \text{per stage} = 1 \end{cases} \quad (29)$$

$$F = \begin{cases} 2C_{16}^7 \times I_{8 \times 8} & \text{per stage} = 0 \\ -(H_7)_8 & \text{per stage} = 1 \end{cases} \quad (30)$$

$$G = \begin{cases} 2C_{16}^5 \times I_{8 \times 8} & \text{per stage} = 0 \\ -(H_3)_8 & \text{per stage} = 1 \end{cases} \quad (31)$$

Figure 15:
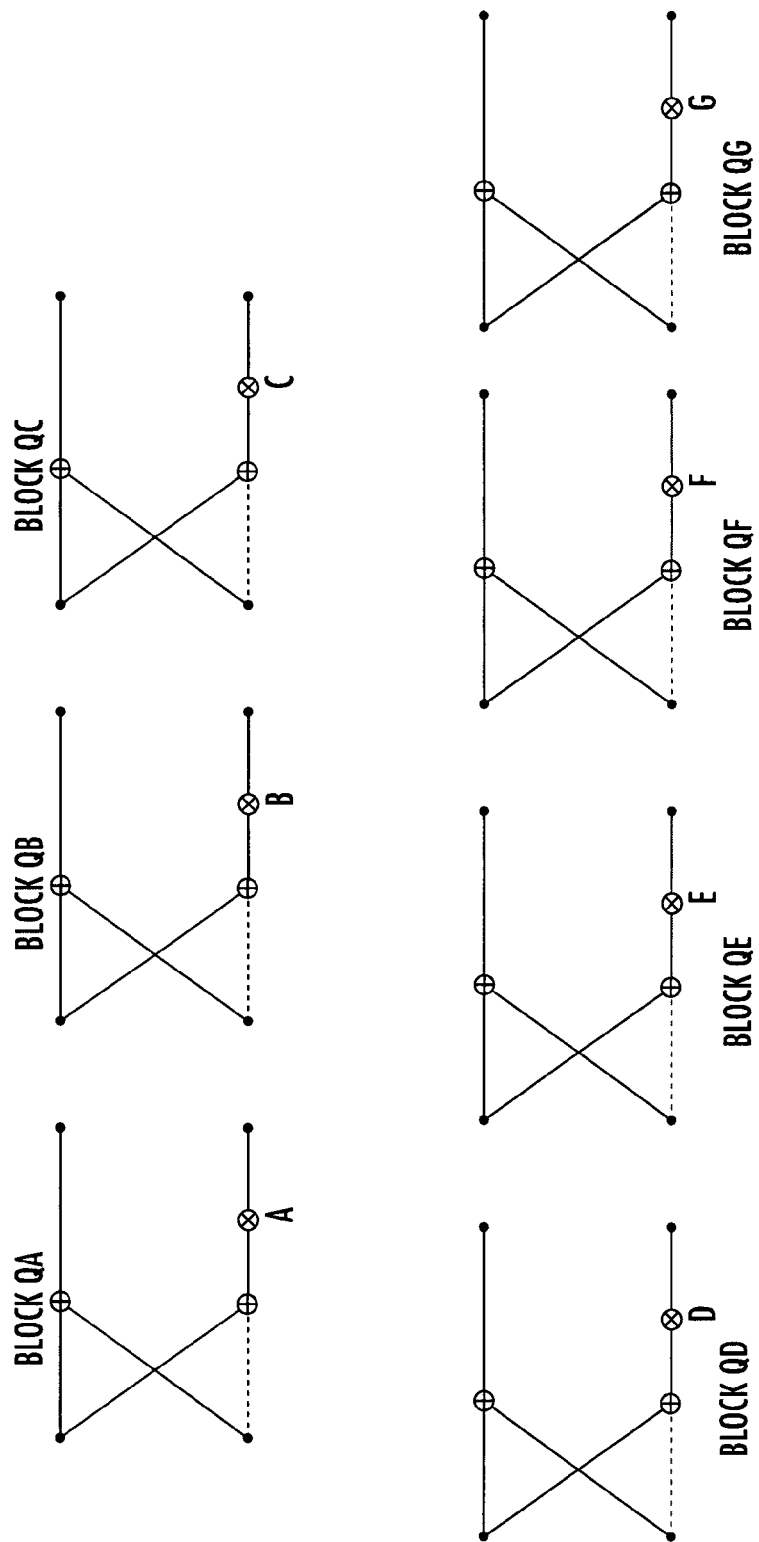
FIG. 15 shows the functional schemes of the blocks that implement the PROCESS phase in the scaleable architecture of the invention.

The scheme in FIG. 14 may be subdivided into the architectural blocks shown in FIG. 15. For example, two vectors each of eight components (each component being a pixel, that may have been processed already) are input to the QA block, which outputs two vectors of eight components: the first vector is the sum of the two input vectors, while the second vector is the difference between the two input vectors that is successively processed with the linear operator A. It should be noted that the operators A, B, C, D, E, F, G are 8×8 matrices.

Figure 16:
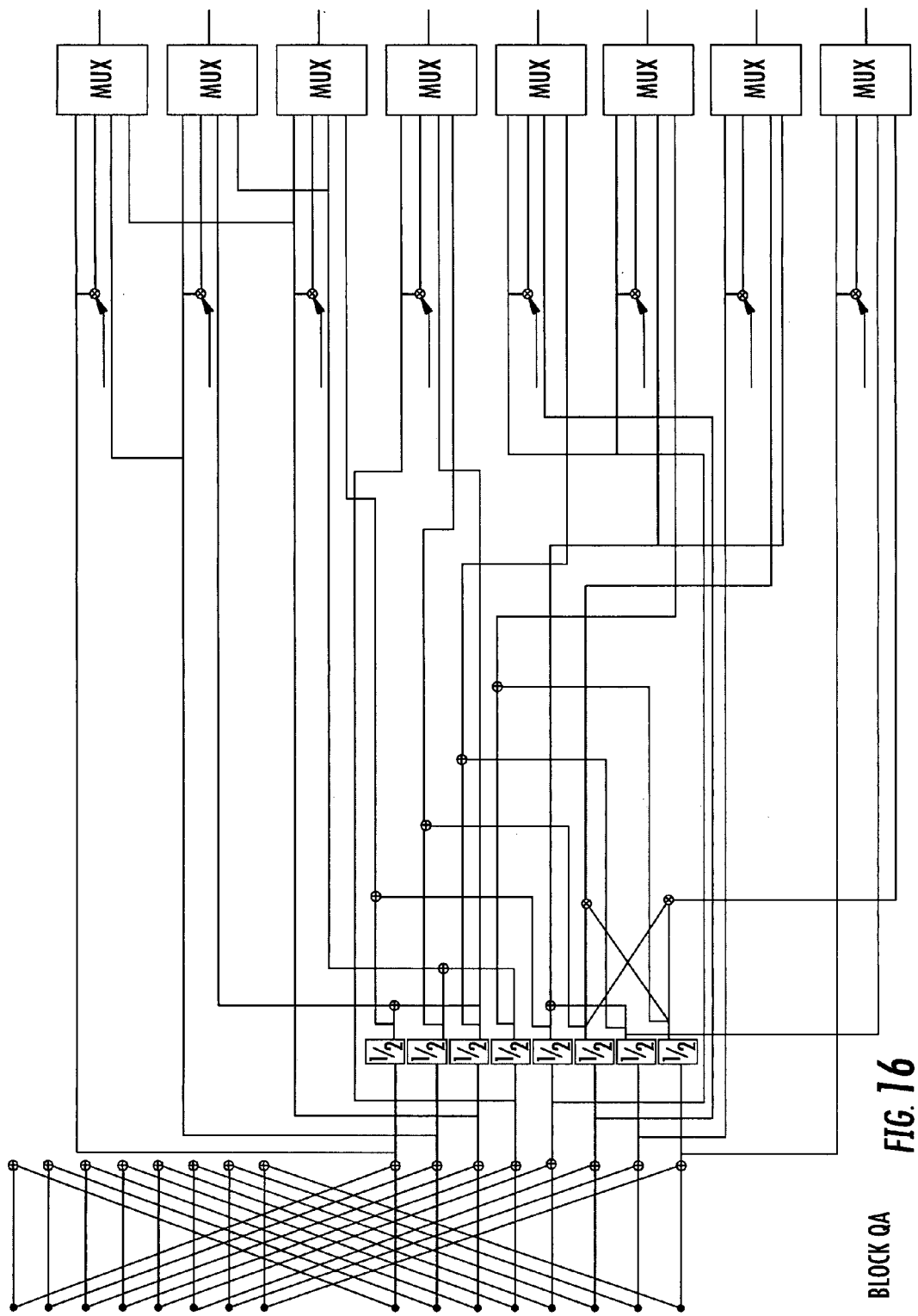
FIG. 16 is a detailed scheme of the QA block.
Figure 17:
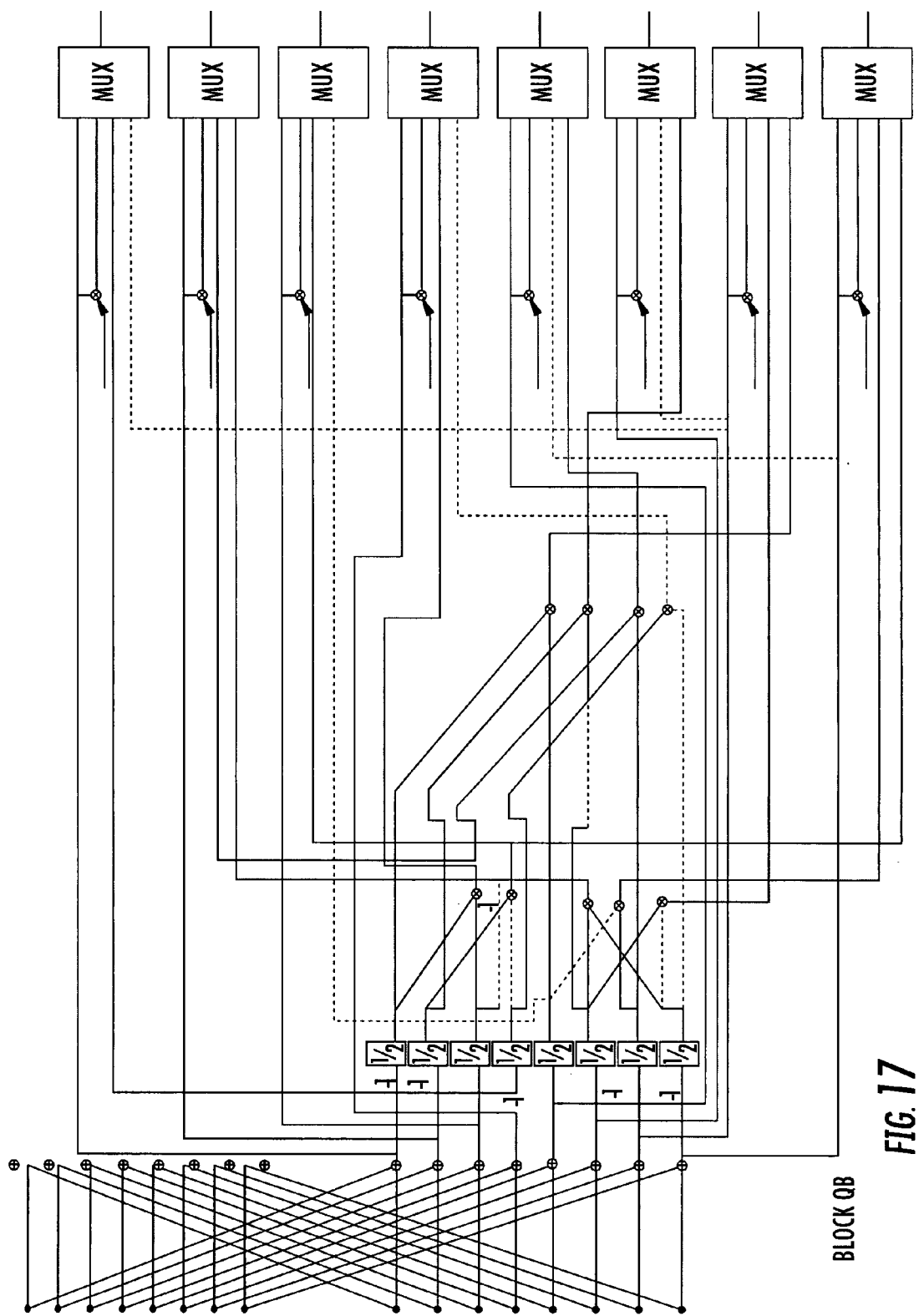
FIG. 17 is a detailed scheme of the QB block.
Figure 18:
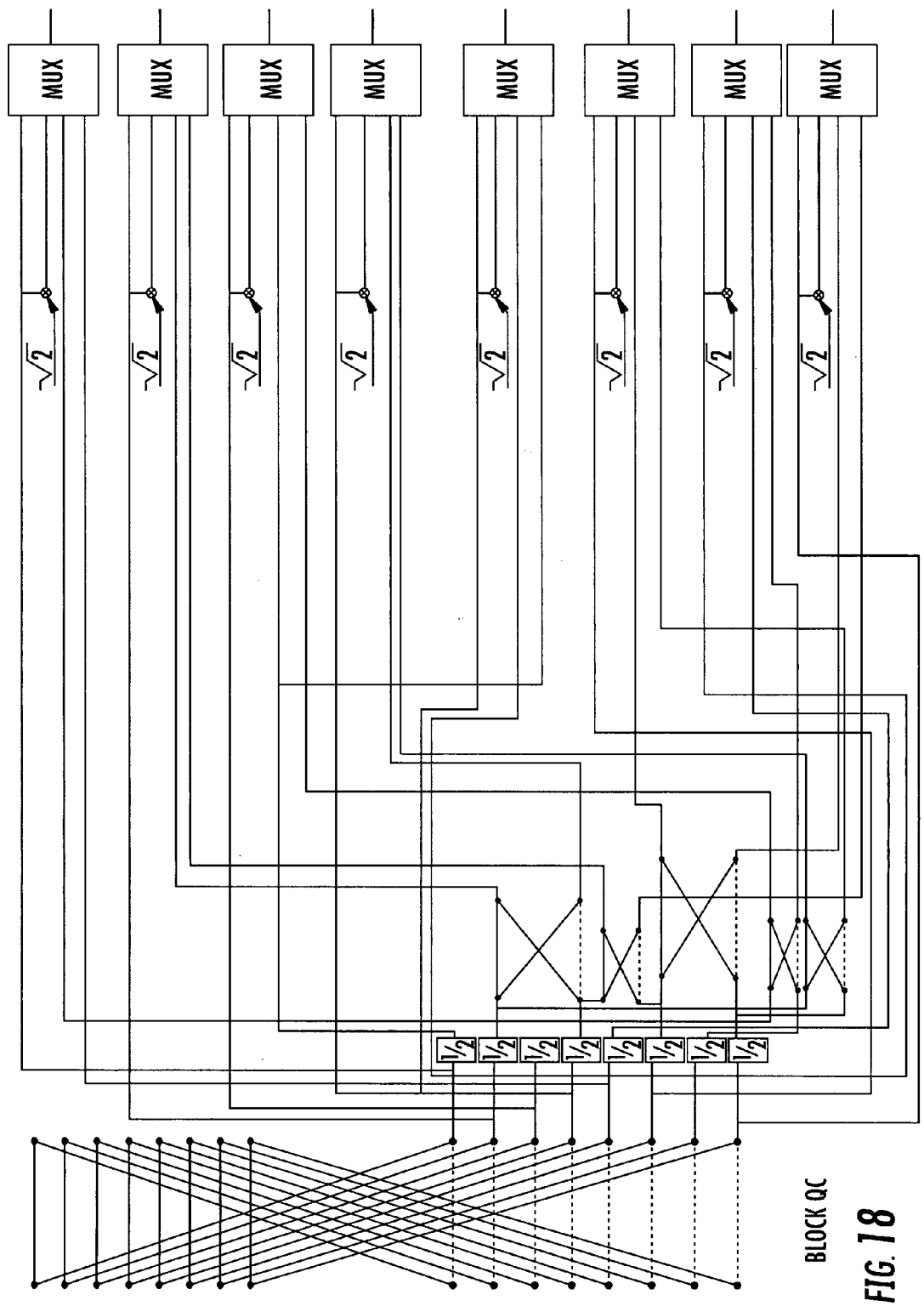
FIG. 18 is a detailed scheme of the QC block.

By considering a lower level of generalization, the QA, QB, QC blocks are shown in detail in FIGS. 16, 17 and 18, respectively. In these figures the MUXes are controlled by three bits, which correspond to the variable stage (which may take the value 0 or 1, and thus is represented by a bit) and the variable size (which may take the value 0, 1 or 2, and thus is represented by two bits). The blocks QD, QE, QF, QG are shown in detail in FIGS. 19, 20, 21 and 22, respectively. In these figures the MUXes are controlled by a bit that corresponds to the variable stage.

ORDER Phase

Figure 23:
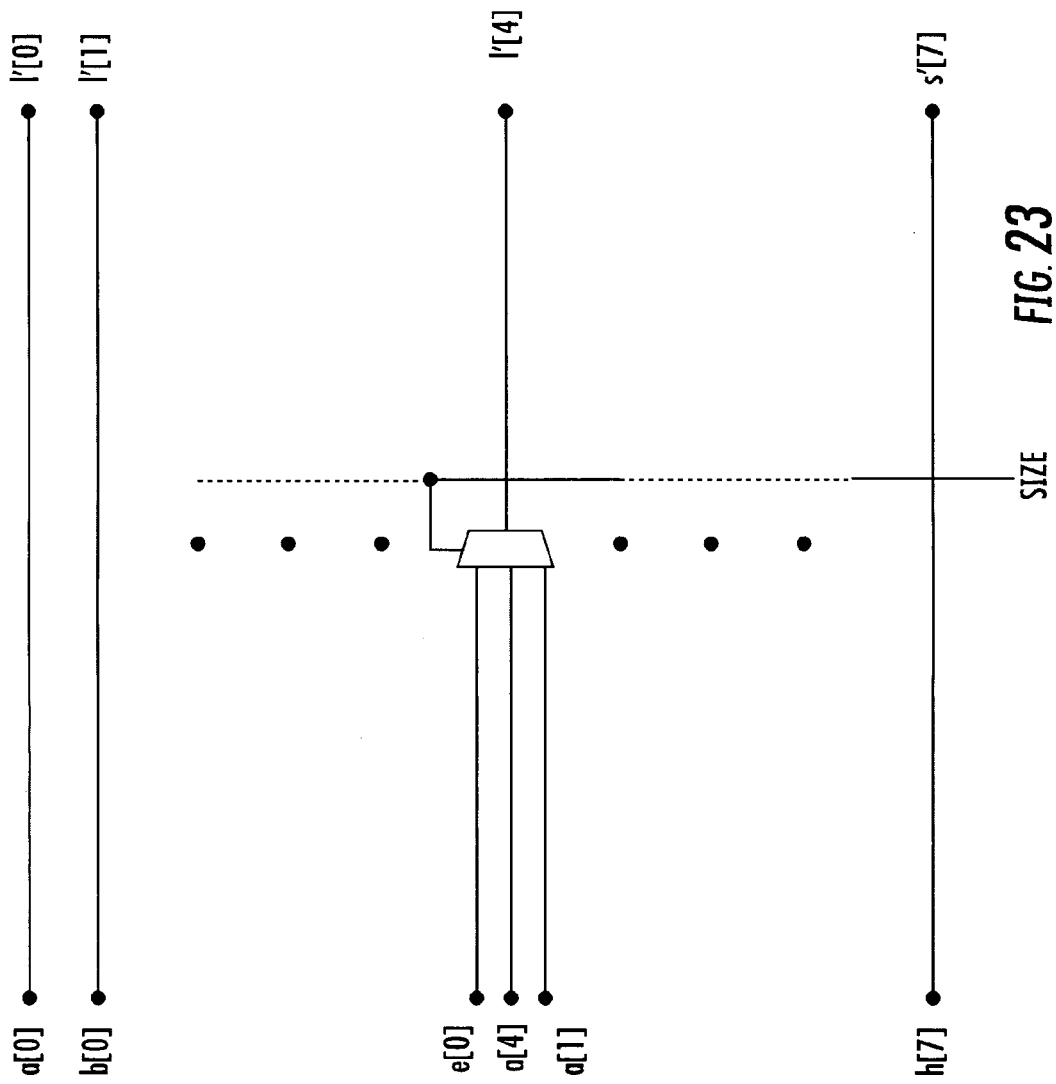
FIG. 23 illustrates an implementation of the ORDER phase in the scaleable architecture of the invention.

The ORDER phase, depicted in FIG. 23, includes arranging the output sequences of the eight 1-D DCTs in eight vectors l', m', . . . , s'. For example:

$$l'[0] = a[0];$$

$$l'[1] = b[0];$$

$$\vdots$$

$$l'[4] = \begin{cases} e[0] & \text{per size} = 0 \\ a[4] & \text{per size} = 1 \\ a[1] & \text{per size} = 2 \end{cases}$$

$$\vdots$$

$$s'[7] = h[7];$$

OUTPUT Phase

Figure 24:
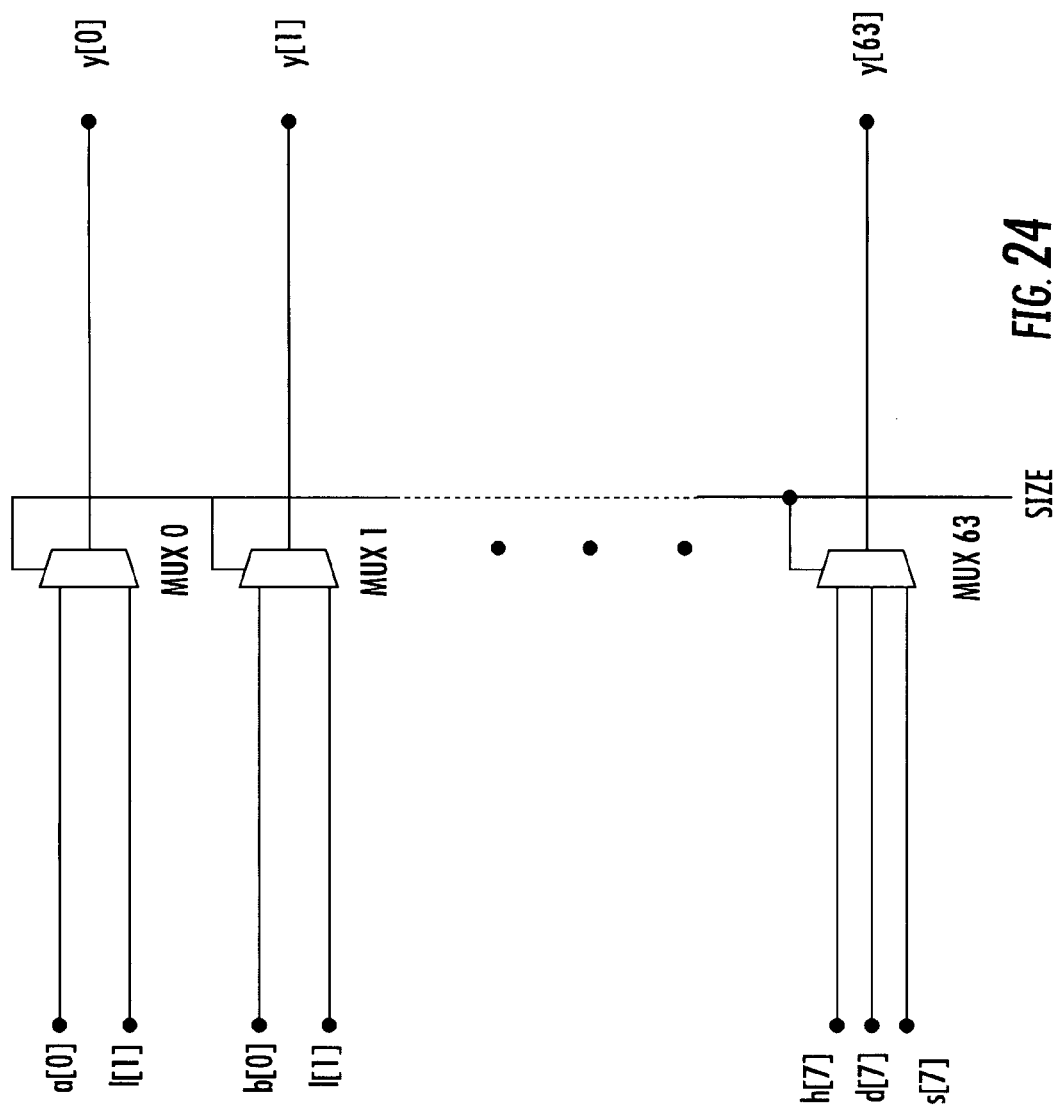
FIG. 24 illustrates an implementation of the OUTPUT phase in the scaleable architecture of the invention.

This phase, depicted in FIG. 24, includes rearranging the data coming from the second (that is with stage=1) execution of the PROCESS step. Starting from these data, constituting the eight-component vectors a, b, . . . , h, the output block yN*N is constituted.

For example:

$$y[0] = \begin{cases} a[0] & \text{per size} = 0 \text{ or } 1 \\ l[2] & \text{per size} = 2 \end{cases}$$

$$y[1] = \begin{cases} b[0] & \text{per size} = 0 \text{ o } 1 \\ l[1] & \text{per size} = 2 \end{cases}$$

$$\vdots$$

$$y[63] = \begin{cases} h[7] & \text{per size} = 0 \\ d[7] & \text{per size} = 1 \\ s[7] & \text{per size} = 2 \end{cases}$$

Description of the Drawings

Figure 1:
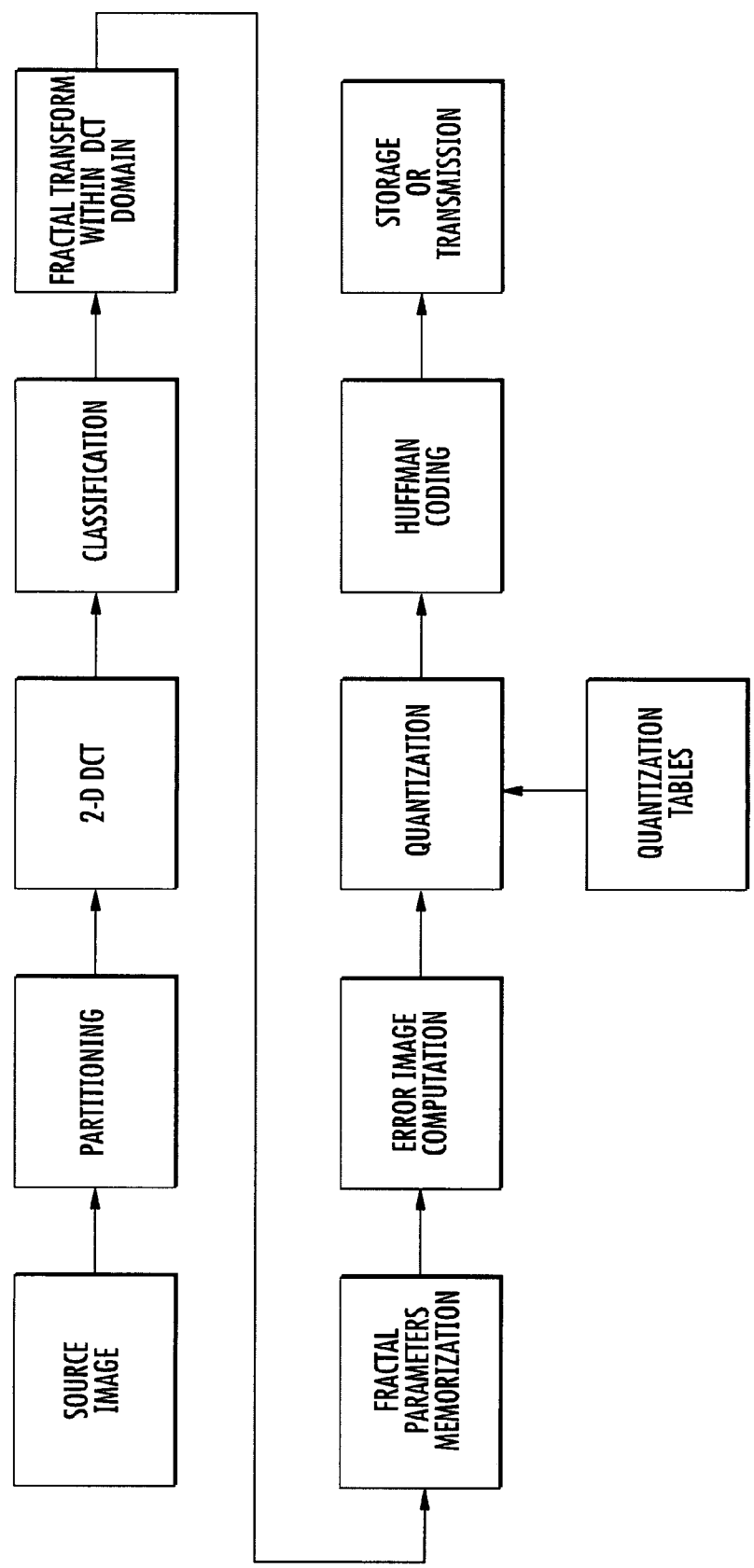
FIG. 1 is a block diagram of a coder effecting hybrid compression based on fractal coding and DCT, according to the present invention.

A functional block diagram of a picture compressor-coder according to the present invention may be represented as shown in FIG. 1.

Essentially, the compressor-coder performs a hybrid compression based on a fractal coding in the DCT domain. This is made possible by the peculiar architecture of parallel calculation of the DCT on blocks of scaleable size of pixels, as described above.

Hereinbelow, the remaining figures are described one by one:

FIG. 2 is a flow graph of the 2×2 DCT generating block.

This block is the "base" block that is repeatedly used in the PROCESS phase of all the N×N DCTs, where N is a power of 2.

In particular:

the flow graph for a 2×2 DCT is shown in FIG. 2, wherein A=B=C=1 and the input and output data are pixels in the positions (0,0), (0,1), (1,0), (1,1);

for sixteen 2×2 DCTs, the inputs and the outputs are eight-component vectors and the following symbols are used, considering $A=B=C=I_{8\times 8}$;

for four 4×4 DCTs the inputs and outputs are eight-component vectors and the following symbols are used:

$$A = \begin{cases} 2C_8^1 \times I_{8\times 8} & \text{per stage} = 0 \\ \begin{bmatrix} (H_1)_4 & 0 \\ 0 & (H_1)_4 \end{bmatrix} & \text{per stage} = 1 \end{cases} \quad (32)$$

$$B = \begin{cases} 2C_8^3 \times I_{8\times 8} & \text{per stage} = 0 \\ \begin{bmatrix} -(H_3)_4 & 0 \\ 0 & -(H_3)_4 \end{bmatrix} & \text{per stage} = 1 \end{cases} \quad (33)$$

$$C = \begin{cases} 2C_4^1 \times I_{8\times 8} & \text{per stage} = 0 \\ \begin{bmatrix} (H_2)_4 & 0 \\ 0 & (H_2)_4 \end{bmatrix} & \text{per stage} = 1 \end{cases} \quad (34)$$

for an 8×8 DCT, the inputs and outputs are eight-component vectors and the flowing symbols are used:

$$A = \begin{cases} 2C_8^1 \times I_{8\times 8} & \text{per stage} = 0 \\ (H_2)_8 & \text{per stage} = 1 \end{cases} \quad (35)$$

$$B = \begin{cases} 2C_8^3 \times I_{8\times 8} & \text{per stage} = 0 \\ -(H_6)_8 & \text{per stage} = 1 \end{cases} \quad (36)$$

$$C = \begin{cases} 2C_4^1 \times I_{8\times 8} & \text{per stage} = 0 \\ (H_4)_8 & \text{per stage} = 1 \end{cases} \quad (37)$$

In the scaleable architecture for calculating an 8×8 DCT or four 4×4 DCTs (in parallel) or sixteen 2×2 DCTs (in parallel), the inputs and the outputs are vectors of eight components and the following symbols are used:

$$A = \begin{cases} 2C_8^1 \times I_{8\times 8} & \text{per (stage, size)} = (0, 0) \text{ or } (0, 1) \\ I_{8\times 8} & \text{per (stage, size)} = (0, 2) \text{ or } (1, 2) \\ (H_2)_8 & \text{per (stage, size)}(1, 0) \\ \begin{bmatrix} (H_1)_4 & 0 \\ 0 & (H_1)_4 \end{bmatrix} & \text{per (stage, size)}(1, 1) \end{cases} \quad (38)$$

$$B = \begin{cases} 2C_8^3 \times I_{8\times 8} & \text{per (stage, size)} = (0, 0) \text{ or } (0, 1) \\ I_{8\times 8} & \text{per (stage, size)} = (0, 2) \text{ or } (1, 2) \\ -(H_6)_8 & \text{per (stage, size)}(1, 0) \\ \begin{bmatrix} -(H_3)_4 & 0 \\ 0 & -(H_3)_4 \end{bmatrix} & \text{per (stage, size)}(1, 1) \end{cases} \quad (39)$$

$$C = \begin{cases} 2C_4^1 \times I_{8\times 8} & \text{per (stage, size)} = (0, 0) \text{ or } (0, 1) \\ I_{8\times 8} & \text{per (stage, size)} = (0, 2) \text{ or } (1, 2) \\ (H_4)_8 & \text{per (stage, size)}(1, 0) \\ \begin{bmatrix} (H_2)_4 & 0 \\ 0 & (H_2)_4 \end{bmatrix} & \text{per (stage, size)}(1, 1) \end{cases} \quad (40)$$

FIG. 3 illustrates the architecture for calculating sixteen 2×2 DCTs in parallel.

The pixels that constitute the input block are ordered during the INPUT phase and processed during the PROCESS phase to obtain the coefficients of the sixteen 2-D DCTs on four samples. For example, the 2-D DCT of the block (0,1) constituted by {l[0],m[0],n[0],o[0]} is }a[0],b[0],c[0],d[0]}.

The coefficients of the 2-D DCTs are rearranged during the ORDER phase in eight vectors of eight components. For example the coefficients }a[0],b[0],c[0],d[0]} will constitute the vector l'.

The sixteen two-component vectors so obtained are sent to the PROCESS phase to obtain the coefficients of the 2×2 DCT. These coefficients, reordered during the OUTPUT phase, constitute the output block.

FIG. 4 shows the ordering of the input data for calculating sixteen 2×2 DCTs.

This figure shows the way the pixels of the 8×8 input block are ordered to constitute the vectors of 8 components l, m, . . . , s. In each quadrant (i,j), with $0 \leq i,j \leq 3$, the pixels belonging to the vectors are symbolized by different shadings. For example:
$\{A_{i,k}^{0,0}\}_{k=0}^{1} = \{x_{0,0}, x_{1,1}\}$ From each of these vectors, the components with the same index (that is the pixels with the same column index) will form a vector of four components. For example the vector l is constituted by the elements $\{A1[0], B1[0]\}$.

Therefore, each pixel of the 8×8 input block will constitute a component of one of the vectors l, m, n, o, p, q, r, s.

FIG. 5 shows the process phase for calculating sixteen 2×2 DCTs.

This phase includes processing the eight-component vectors l, m, . . . , s. The PROCESS phase, which is the only phase in which arithmetical operations are performed, is executed only once to calculate in parallel the sixteen 2-D DCTs.

FIG. 6 illustrates the architecture for calculating four 4×4 DCTs.

The pixels that constitute the input block are ordered in the INPUT phase and processed in the PROCESS phases to obtain the coefficients of the sixteen 1-D DCTs on 4 samples. For example, the 1-D DCT of the sequence $\{l[0], m[0], n[0],$ or $[0]\}$ is $\{a[0], b[0], c[0], d[0]\}$.

The coefficients of the 1-D DCTs are reordered in the ORDER phase in 8 vectors of eight components. For example the coefficients $\{a[0], b[0], c[0], d[0]\}$ will constitute the vector l'.

The 4 four-component vectors so obtained are sent to the PROCESS phase to obtain the coefficients of the 4×4 DCT. These coefficients, reordered in the OUTPUT phase, constitute the output block.

FIG. 7 shows the arrangement of the input data for calculating four 4×4 DCTs.

This figure shows how the pixels of the 8×8 input block are ordered to constitute the eight-component vectors l, m, . . . , s.

In each quadrant (i,j), with $0 \leq i,j \leq 3$, the pixels belonging to the different vectors have different shadings. For example:
$\{A_{i,k}^{0,0}\}_{k=0}^{3} = \{x_{0,0}, x_{1,1}, x_{2,2}, x_{3,3}\}$ From each of these vectors, the components with the same index (that is, the pixels with the same column index) will form a vector of four components. For example the vector l is constituted by the elements $\{A1[0], A3[0], B3[0], B1[0]\}$.

The outcome is that each pixel of the input 8×8 block will constitute one component of one of the vectors l, m, n, o, p, q, r, s.

FIG. 8 depicts the PROCESS phase for calculating the four 4×4 DCTs.

This phase includes processing the eight-component vectors: l, m, . . . , s.

The PROCESS phase, which is the only phase wherein arithmetical operations are performed, is carried out twice:
the first time (stage=0), to calculate in parallel the sixteen 1-D DCTs;
the second time (stage=1), to calculate the 8×8 DCT starting from the coefficients of the 1-D DCTs.

$$A = \begin{cases} 2C_8^1 \times I_{8 \times 8} & \text{per stage} = 0 \\ \begin{bmatrix} (H_1)_4 & 0 \\ 0 & (H_1)_4 \end{bmatrix} & \text{per stage} = 1 \end{cases}, \quad (41)$$

$$B = \begin{cases} 2C_8^3 \times I_{8 \times 8} & \text{per stage} = 0 \\ \begin{bmatrix} -(H_3)_4 & 0 \\ 0 & -(H_3)_4 \end{bmatrix} & \text{per stage} = 1 \end{cases}, \quad (42)$$

$$C = \begin{cases} 2C_4^1 \times I_{8 \times 8} & \text{per stage} = 0 \\ \begin{bmatrix} (H_2)_4 & 0 \\ 0 & (H_2)_4 \end{bmatrix} & \text{per stage} = 1 \end{cases}, \quad (43)$$

$$t = \begin{cases} 1 & \text{per stage} = 0 \\ 2 & \text{per stage} = 1 \end{cases}, \quad (44)$$

FIG. 9 illustrates the architecture for calculating an 8×8 DCT.

The pixels that constitute the input block are ordered during the INPUT phase and are processed in the PROCESS phase to obtain the coefficients of the eight 1-D DCTs on 8 samples. For example, the 1-D DCT of the sequence $\{l[0], m[0], \ldots, s[0]\}$ is $\{a[0], b[0], \ldots, h[0]\}$.

The coefficients of the 1-D DCTs are rearranged during the ORDER phase in 8 vectors of eight components. For example the coefficients $\{a[0], b[0], \ldots, h[7]\}$ will constitute the l'vector.

The 8 eight-component vectors so obtained are sent to the PROCESS phase to obtain the 8×8 DCT coefficients. These coefficients, rearranged during the OUTPUT phase, constitute the output block.

FIG. 10 shows the arrangement of the input data for calculating an 8×8 DCT.

This figure shows how the pixels of the input 8×8 block are arranged to constitute the 8 eight-component vectors l, m, . . . , s. The pixels belonging to the vectors A1, A3, A5, A7, B7, B5, B3, B1 are symbolized with different shadings, for example:
$\{A_{1,1}\}_{i=0}^{7} = \{x_{0,0}, x_{1,1}, x_{2,2}, x_{3,3}, x_{4,4}, x_{5,5}, x_{6,6}, x_{7,7}\}$ From each of these vectors, the components with the same index (that is, the pixels with the same column index) will form a vector of eight components. For example, the vector l is constituted by the elements $\{A1[0], A3[0], \ldots, B1[0]\}$.

The result is that each pixel of the input 8×8 block will constitute a component of one of the vectors l, m, n, o, p, q, r, s.

FIG. 11 depicts the PROCESS phase for calculating an 8×8 DCT.

This phase includes processing the eight-component vectors l, m, . . . , s.

The PROCESS phase in which arithmetical operations are performed is executed twice:
the first time (stage=0), to calculate in parallel the sixteen 1-D DCTs;
the second time (stage=1), to calculate the 8×8 DCT starting from the coefficients of the 1-D DCTs. In FIG. 11 the following symbols have been used:

$$A = \begin{cases} 2C_8^1 \times I_{8 \times 8} & \text{per stage} = 0 \\ (H_2)_8 & \text{per stage} = 1 \end{cases}, \quad (45)$$

-continued $$B = \begin{cases} 2C_8^3 \times I_{8\times 8} & \text{per stage} = 0 \\ -(H_6)_8 & \text{per stage} = 1 \end{cases}, \quad (46)$$

$$C = \begin{cases} 2C_4^1 \times I_{8\times 8} & \text{per stage} = 0 \\ (H_4)_8 & \text{per stage} = 1 \end{cases}, \quad (47)$$

$$t = \begin{cases} 1 & \text{per stage} = 0 \\ 2 & \text{per stage} = 1 \end{cases}, \quad (48)$$

FIG. 12 illustrates a scaleable architecture for calculating an 8×8 DCT or four 4×4 DCTs or sixteen 2×2 DCTs.

The pixels that constitute the input block are ordered during the INPUT phase and processed during the PROCESS phase, which calculates:

the 1-D DCTs (for stage=0, that is for the 8×8 DCT, and for stage=1, that is for the 4×4 DCTs;

the 2-D DCTs for stage=2 directly, that is for the 2×2 DCTs;

When stage=0 and stage=1 the coefficients are then rearranged in the ORDER phase in 8 eight-component vectors, which are sent to the PROCESS phase to obtain the coefficients of the 2-D DCT. These coefficients, rearranged in the OUTPUT phase, constitute the output block.

If stage=2 the coefficients are transmitted directly to the OUTPUT phase, where they are rearranged to constitute the output block.

FIG. 13 depicts the INPUT phase for a scaleable architecture.

The inputs are the 64 pixels that constitute the input block.

The arrangement of the inputs is operated through the MUXes controlled by the size variable.

The 64 outputs are the 8 vectors of eight components l, m, ..., s.

FIG. 14 depicts the PROCESS phase for a scaleable architecture.

This phase includes calculating in parallel the eight 1-D DCTs by processing the vectors l, m, ..., s as shown in FIG. 11.

In this figure we may notice that the use of 16 MUXes controlled by size.

The eight MUXes on the left serve to bypass the necessary operations only for calculating the 8×8 DCT; therefore, the bypass takes place for stage=1 or 2, while it does not occur when stage=0.

The eight MUXes on the right serve to output only the result corresponding to the pre-selected size.

In FIG. 14 the following symbols are used:

$$t = \begin{cases} 1 & \text{per stage} = 0 \\ 2 & \text{per stage} = 1 \end{cases}, \quad (49)$$

$$A = \begin{cases} 2C_8^1 \times I_{8\times 8} & \text{per (stage, size)} = (0, 0) \text{ or } (0, 1) \\ I_{8\times 8} & \text{per (stage, size)} = (0, 2) \text{ or } (1, 2) \\ (H_2)_8 & \text{per (stage, size)}(1, 0) \\ \begin{bmatrix} (H_1)_4 & 0 \\ 0 & (H_1)_4 \end{bmatrix} & \text{per (stage, size)}(1, 1) \end{cases}, \quad (50)$$

$$= \begin{cases} 2C_8^3 \times I_{8\times 8} & \text{per (stage, size)} = (0, 0) \text{ or } (0, 1) \\ I_{8\times 8} & \text{per (stage, size)} = (0, 2) \text{ or } (1, 2) \\ -(H_6)_8 & \text{per (stage, size)}(1, 0) \\ \begin{bmatrix} -(H_3)_4 & 0 \\ 0 & -(H_3)_4 \end{bmatrix} & \text{per (stage, size)}(1, 1) \end{cases}, \quad (51)$$

$$= \begin{cases} 2C_4^1 \times I_{8\times 8} & \text{per (stage, size)} = (0, 0) \text{ or } (0, 1) \\ I_{8\times 8} & \text{per (stage, size)} = (0, 2) \text{ or } (1, 2) \\ (H_4)_8 & \text{per (stage, size)}(1, 0) \\ \begin{bmatrix} (H_2)_4 & 0 \\ 0 & (H_2)_4 \end{bmatrix} & \text{per (stage, size)}(1, 1) \end{cases}, \quad (52)$$

$$D = \begin{cases} 2C_{16}^1 \times I_{8\times 8} & \text{per stage} = 0 \\ (H_1)_8 & \text{per stage} = 1 \end{cases}, \quad (53)$$

$$E = \begin{cases} 2C_{16}^3 \times I_{8\times 8} & \text{per stage} = 0 \\ (H_5)_8 & \text{per stage} = 1 \end{cases}, \quad (54)$$

$$F = \begin{cases} 2C_{16}^7 \times I_{8\times 8} & \text{per stage} = 0 \\ -(H_7)_8 & \text{per stage} = 1 \end{cases}, \quad (55)$$

$$G = \begin{cases} 2C_{16}^5 \times I_{8\times 8} & \text{per stage} = 0 \\ -(H_3)_8 & \text{per stage} = 1 \end{cases}, \quad (56)$$

FIG. 15 is a block diagram of the structure that implements the PROCESS phase.

For example, the QA block receives as an input two vectors of eight components (each component is a pixel, that may have already been processed) and outputs two vectors of eight components. The first vector is the sum of the two input vectors, while the second vector is the difference between the two input vectors, successively processed with the linear operator A. It should be noticed that the A, B, C, D, E, F, G operators are 8×8 matrices.

FIG. 16 is a detailed scheme of the QA block.

This scheme shows the details of the single components of the two input vectors and the arithmetical operators (adders etc.) which act on each component. The results are sent to the MUXes depicted on the right side of the figure, each of which, depending on the control variables stage and size, select only one result, which constitutes one component of the output vector.

FIG. 17 is a detailed scheme of the QB block.

This scheme shows the details of the single components of the two input vectors and the arithmetical operators (adders etc.) which act on each component. The results are sent to the MUXes depicted on the right side of the figure, each of which, depending on the control variables stage and size, select only one result, which constitute a component of the output vector.

FIG. 18 is a detailed scheme of the QC block.

This scheme shows the details of the single components of the two input vectors and the arithmetical operators (adders etc.) acting on each component. The results are sent to the MUXes depicted on the right side of the figure, each of which, depending on the control variable stage and size, select only one result, which constitute one component of the output vector.

Figure 19:
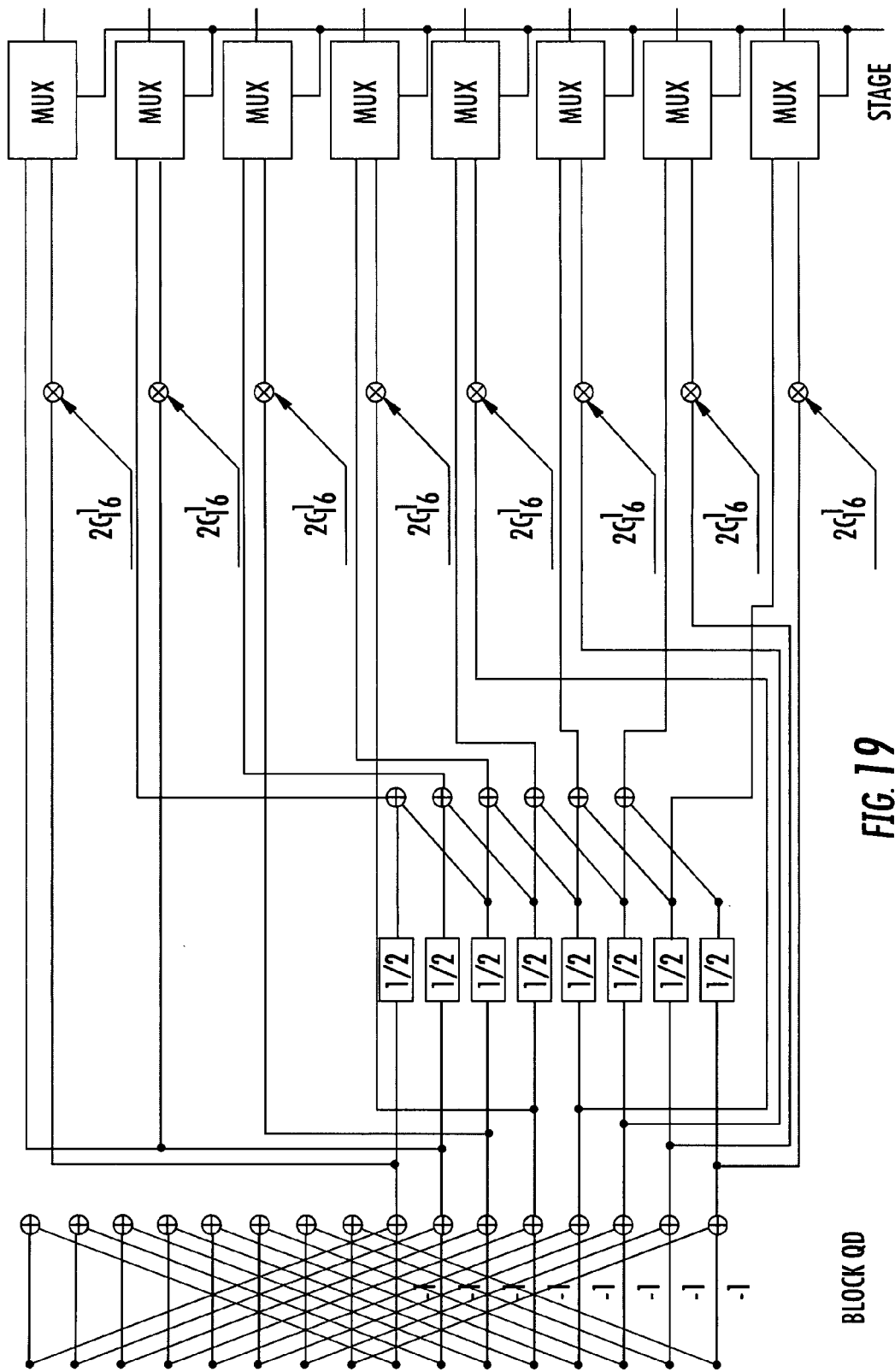
FIG. 19 is a detailed scheme of the QD block.

FIG. 19 is a detailed scheme of the QD block.

This scheme shows the details of the single components of the two input vectors and the arithmetical operators (adders etc.) which act on each component. The results are sent to the MUXes depicted on the right side of the figure, each of which, depending on the control variable stage and size, select only one result, which constitute a component of the output vector.

Figure 20:
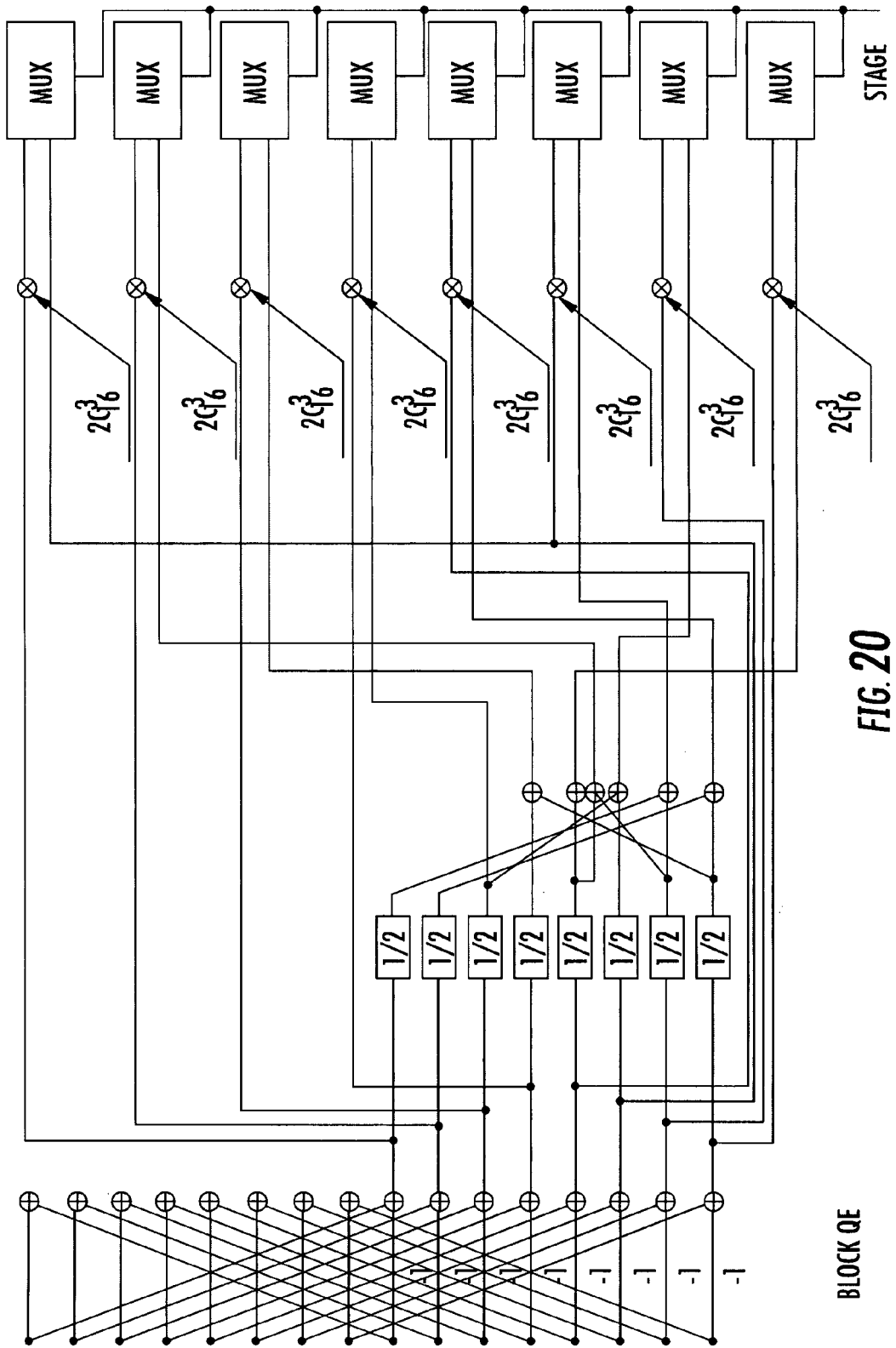
FIG. 20 is a detailed scheme of the QE block.

FIG. 20 is a detailed scheme of the QE block.

This scheme shows the details of the single components of the two input vectors and the arithmetical operators (adders etc.) which act on each component. The results are sent to the MUXes depicted on the right side of the figure, each of which, depending on the control variable stage, select only one result, which constitute one component of the output vector.

Figure 21:
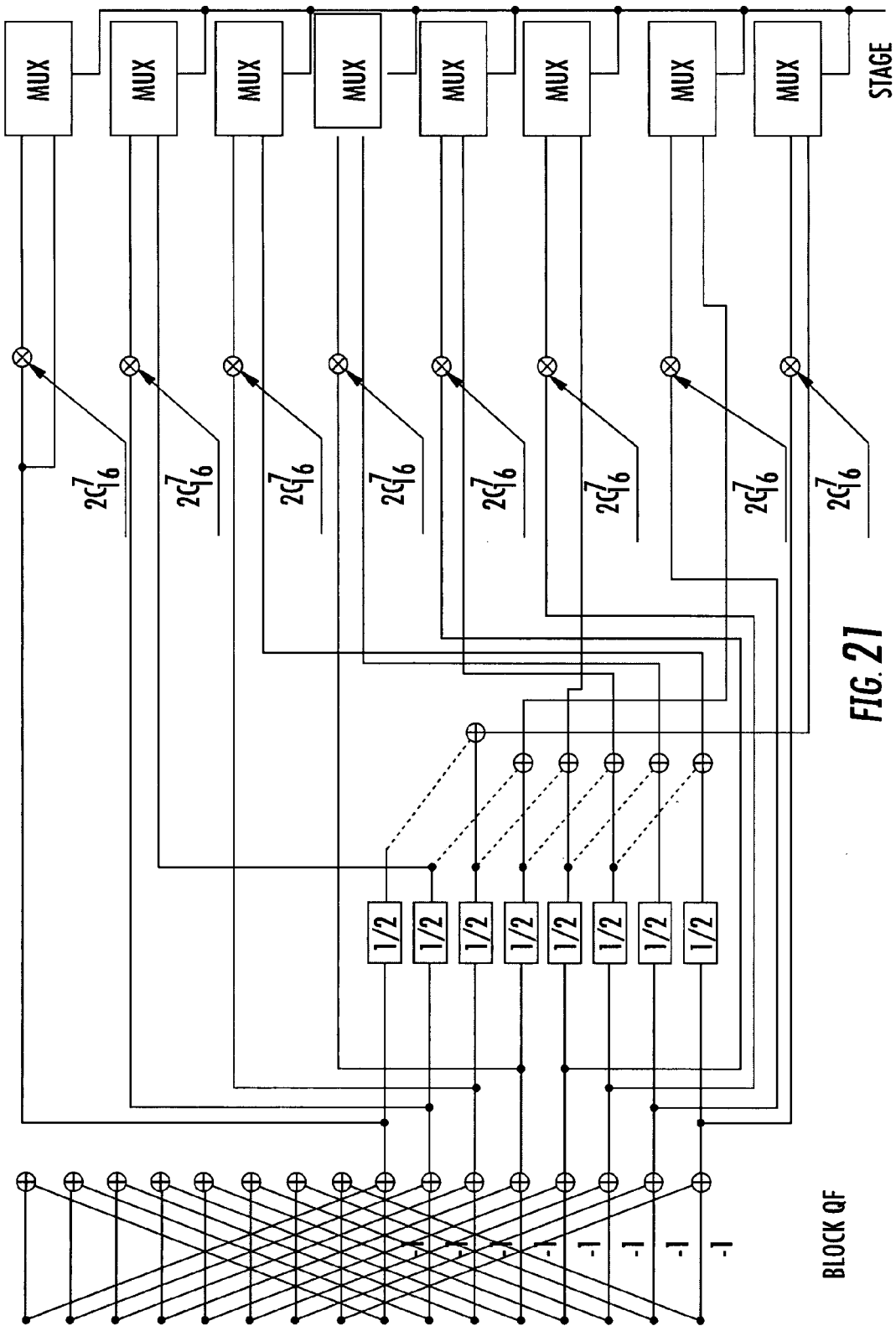
FIG. 21 is a detailed scheme of the QF block.

FIG. 21 is a detailed scheme of the QF block.

This scheme shows the details of the single components of the two input vectors and the arithmetical operators (adders etc.) which act on each component. The results are sent to the MUXes depicted on the right side of the figure, each of which, depending on the control variable {\em stage} select only one result, which constitute a component of the output vector.

Figure 22:
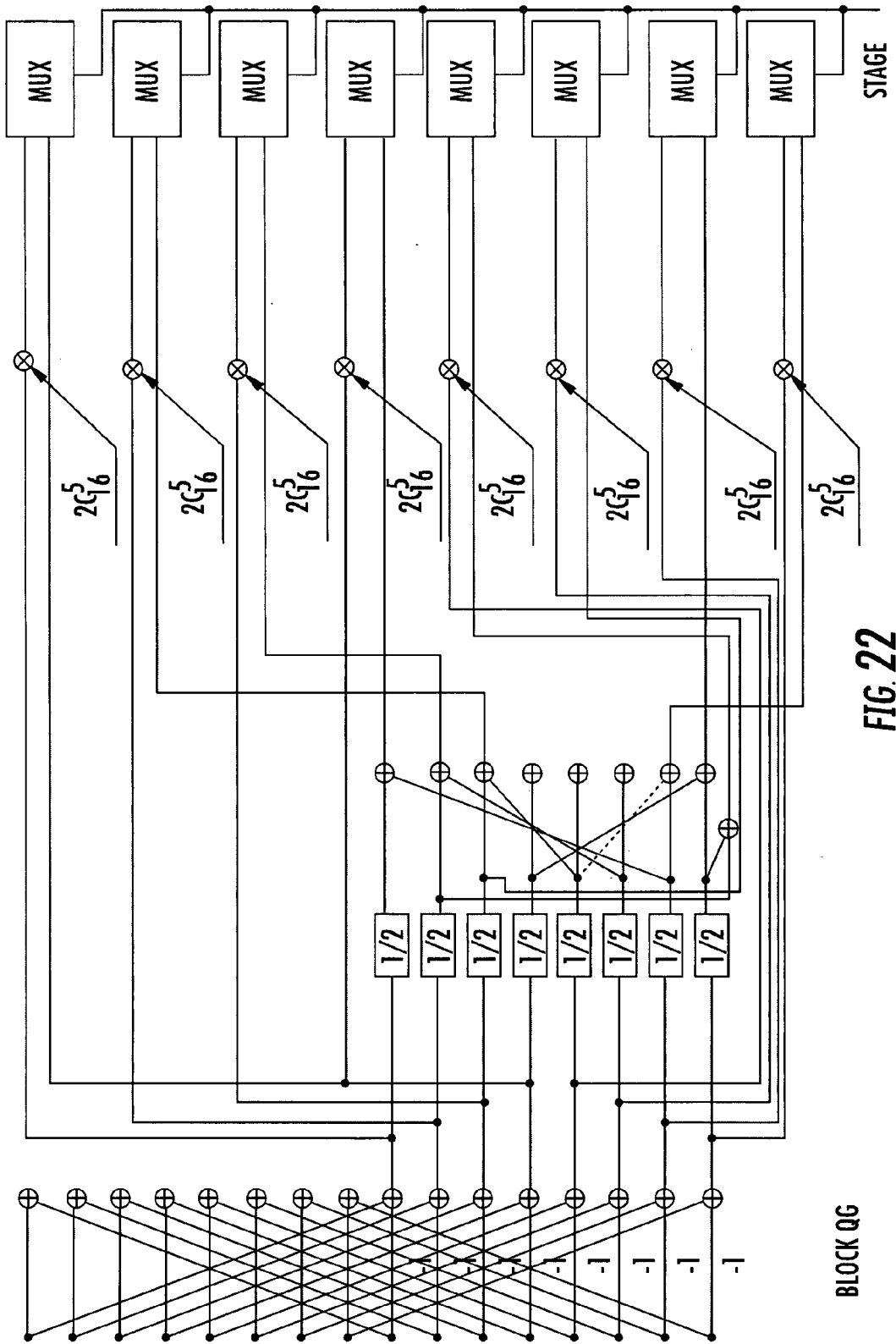
FIG. 22 is a detailed scheme of the QG block.

FIG. 22 is a detailed scheme of the QG block.

This scheme shows the details of the single components of the two input vectors and the arithmetical operators (adders etc.) which act on each component. The results are sent to the MUXes depicted on the right side of the figure, each of which, depending on the control variable stage, select only one result, which constitute a component of the output vector.

FIG. 23 depicts the ORDER phase for the scaleable architecture.

The inputs are constituted by the 64 pixels after they have been processed through the PROCESS phase.

The inputs arrangement is effected by the MUXes controlled by the variable size.

The 64 outputs are the components of the eight-component vectors l, m, . . . , s.

FIG. 24 depicts the OUTPUT phase for the scaleable architecture.

The inputs are constituted by the 64 2-D DCT coefficients. The input arrangement is effected by the MUXes controlled by the variable size.

The 64 outputs are the pixels that constitute the output block.

The invention claimed is:

1. A method of calculating a discrete cosine transform (DCT) of blocks of pixels of an image for compressing image data to be stored or transmitted, comprising:
   a) defining first subdivision blocks as range blocks, having a fractional and scalable size $N/2^i * N/2^i$, where i is an integer;
   b) defining second subdivision blocks of N*N pixels as domain blocks, shiftable by intervals of $N/2^i$ pixels;
   c) ordering the pixels in the range blocks of a certain dimension by rearranging input pixels in $2^i$ vectors of $2^i$ components;
   d) calculating, in parallel, $2^i$ monodimensional DCTs by processing the vectors defined in step c);
   e) arranging output sequences of the monodimensional DCTs relative to the $2^i$ vectors;
   f) completing the calculation in parallel of $2^i$ bidimensional DCTs by processing output sequences of monodimensional DCTs produced in step e); and
   g) arranging output sequences of bidimensional DCTs generated in step f) in $2^i$ vectors of bidimensional DCT coefficients.

2. The method according to claim 1, wherein the step of calculating $2^i$ monodimensional DCTs in parallel in step d) and the step of completing the parallel calculation of $2^i$ bidimensional DCTs of step f) are performed by subdividing the sequences resulting from step c) and from step e), respectively, in groups of scalar elements, calculating the sums and differences thereof by way of adders and subtractors and by reiterately multiplying the sum and difference results by respective coefficients until completing the calculation of the relative DCT coefficients, respectively monodimensional and bidimensional.

3. A method of compressing data of an image to be stored or transmitted, comprising:
   defining first subdivision blocks as range blocks, having a fractional and scalable size $N/2^i * N/2^i$, where i is an integer;
   defining second subdivision blocks of N*N pixels as domain blocks, shiftable by intervals of $N/2^i$ pixels;
   calculating, in parallel, the DCT of $2^i$ range blocks of a relative domain block;
   classifying the transformed range blocks according to their relative complexity represented by a sum of values of three AC coefficients;
   applying a fractal transform in the DCT domain to data of the range blocks whose complexity classification exceeds a pre-defined threshold and only storing a DC coefficient of the range blocks with a complexity lower than the threshold, while identifying a relative domain block to which the range block in a transformation belongs that produces a best fractal approximation of the range block;
   calculating a difference between each range block and its fractal approximation;
   quantizing the difference in the DCT domain by using a quantization table preestablished in consideration of human sight characteristics;
   coding the quantized difference by a process based on probabilities of quantization coefficients; and
   storing or transmitting code of each range block compressed in the DCT domain and the DC coefficient of each uncompressed range block.

4. An apparatus for calculating a discrete cosine transform (DCT) of blocks of pixels of an image for compressing image data to be stored or transmitted, the apparatus comprising:
   means for defining first subdivision blocks as range blocks, having a fractional and scalable size $N/2^i * N/2^i$, where i is an integer;
   means for defining second subdivision blocks of N*N pixels as domain blocks, shiftable by intervals of $N/2^i$ pixels;
   means for ordering the pixels in the range blocks of a certain dimension by rearranging input pixels in $2^i$ vectors of $2^i$ components;
   means for calculating, in parallel, $2^i$ monodimensional DCTs by processing the vectors defined by the means for calculating;
   means for arranging output sequences of the monodimensional DCTs relative to the $2^i$ vectors;
   means for completing the calculation in parallel of $2^i$ bidimensional DCTs by processing output sequences of monodimensional DCTs produced by the means for arranging output sequences of the monodimensional DCTs; and
   means for arranging output sequences of bidimensional DCTs, generated by the means for completing the calculation, in $2^i$ vectors of bidimensional DCT coefficients.

5. The apparatus according to claim 4, wherein the means for calculating $2^i$ monodimensional DCTs in parallel and the means for completing the parallel calculation of $2^i$ bidimensional DCTs are for subdividing the sequences resulting from the means for ordering and the means for arranging output sequences of the monodimensional DCTs, respectively, in groups of scalar elements, calculating the sums and differences thereof by way of adders and subtractors and by reiterately multiplying the sum and difference results by respective coefficients until completing the calculation of the relative DCT coefficients, respectively monodimensional and bidimensional.

6. An apparatus for compressing data of an image to be stored or transmitted, comprising:
   means for defining first subdivision blocks as range blocks, having a fractional and scalable size $N/2^i*N/2^i$, where i is an integer;
   means for defining second subdivision blocks of N*N pixels as domain blocks, shiftable by intervals of $N/2^i$ pixels;
   means for calculating, in parallel, the DCT of $2^i$ range blocks and of a relative domain block;
   means for classifying the transformed range blocks according to their relative complexity represented by a sum of values of three AC coefficients;
   means for applying a fractal transform in the DCT domain to data of the range blocks whose complexity classification exceeds a pre-defined threshold and only storing a DC coefficient of the range blocks with a complexity lower than the threshold, while identifying a relative domain block to which the range block in a transformation belongs that produces a best fractal approximation of the range block;
   means for calculating a difference between each range block and its fractal approximation;
   means for quantizing the difference in the DCT domain by using a quantization table preestablished in consideration of human sight characteristics;
   means for coding the quantized difference by a process based on probabilities of quantization coefficients; and
   means for storing or transmitting code of each range block compressed in the DCT domain and the DC coefficient of each uncompressed range block.

7. An apparatus for calculating the discrete cosine transform (DCT) of blocks of pixels of an image for compressing image data to be stored or transmitted, the apparatus comprising:
   a first defining unit to define first subdivision blocks as range blocks, having a fractional and scalable size $N/2^i*N/2^i$, where i is an integer;
   a second defining unit to define second subdivision blocks of N*N pixels as domain blocks, shiftable by intervals of $N/2^i$ pixels;
   an ordering module to order the pixels in the range blocks of a certain dimension by rearranging input pixels in $2^i$ vectors of $2^i$ components;
   a first calculating module to calculate, in parallel, $2^i$ monodimensional DCTs by processing vectors defined by the calculation unit;
   a first output module to arrange output sequences of the monodimensional DCTs relative to the $2^i$ vectors;
   a second calculating module to complete the calculation in parallel of $2^i$ bidimensional DCTs by processing output sequences of monodimensional DCTs produced by the output module; and
   a second output module to arrange output sequences of bidimensional DCTs, generated by the second calculating module, in $2^i$ vectors of bidimensional DCT coefficients.

8. The apparatus according to claim 7 further comprising an array of adders, subtractors and multipliers and a plurality of path selectors and multiplexers for configuring the array according to a selected value of said integer i, for calculating the DCT on either the undivided domain block of N*N pixels or, in parallel, on said range blocks of subdivisions of the domain block.

* * * * *

UNITED STATES PATENT AND TRADEMARK OFFICE
CERTIFICATE OF CORRECTION

PATENT NO.      : 7,233,623 B1                           Page 1 of 5
APPLICATION NO. : 09/390554
DATED           : June 19, 2007
INVENTOR(S)     : Pau et al.

It is certified that error appears in the above-identified patent and that said Letters Patent is hereby corrected as shown below:

Column 7, Line 1-8   Delete:

$$``\begin{bmatrix} y[0] & y[1] & \cdots & y[7] \\ \vdots & \vdots & \vdots & \vdots \\ y[54] & y[55] & \cdots & y[63] \end{bmatrix} = \begin{bmatrix} l[0] & l[1] & l[4] & l[5] & m[0] & m[1] & m[4] & m[5] \\ l[2] & l[3] & l[6] & l[7] & m[2] & m[3] & m[6] & m[7] \\ n[0] & n[1] & n[4] & n[5] & o[0] & o[1] & o[4] & o[5] \\ n[2] & n[3] & n[6] & n[7] & o[2] & o[3] & o[6] & o[7] \\ p[0] & p[1] & p[4] & p[5] & q[0] & q[1] & q[4] & q[5] \\ p[2] & p[2] & p[6] & p[7] & q[2] & q[3] & q[6] & q[7] \\ r[0] & r[1] & r[4] & r[5] & s[0] & s[1] & s[4] & s[5] \\ r[2] & r[2] & r[6] & r[7] & s[2] & s[3] & s[6] & s[7] \end{bmatrix}\text{''}$$

Insert:

$$--\begin{bmatrix} y[0] & y[1] & \cdots & y[7] \\ \vdots & \vdots & \vdots & \vdots \\ y[54] & y[55] & \cdots & y[63] \end{bmatrix} = \begin{bmatrix} l[0] & l[1] & l[4] & l[5] & m[0] & m[1] & m[4] & m[5] \\ l[2] & l[3] & l[6] & l[7] & m[2] & m[3] & m[6] & m[7] \\ n[0] & n[1] & n[4] & n[5] & o[0] & o[1] & o[4] & o[5] \\ n[2] & n[3] & n[6] & n[7] & o[2] & o[3] & o[6] & o[7] \\ p[0] & p[1] & p[4] & p[5] & q[0] & q[1] & q[4] & q[5] \\ p[2] & p[3] & p[6] & p[7] & q[2] & q[3] & q[6] & q[7] \\ r[0] & r[1] & r[4] & r[5] & s[0] & s[1] & s[4] & s[5] \\ r[2] & r[3] & r[6] & r[7] & s[2] & s[3] & s[6] & s[7] \end{bmatrix}--$$

Column 7, Line 42   Delete:

$$`` \{B_{3,i}\}_{i=0}^{3} = \{x_{2,0}, x_{0,1}, x_{3,2}, x_{1,3}\} \text{''}$$

Insert:

$$-- \{B_{3,i}\}_{i=0}^{3} = \{x_{2,0}, x_{0,1}, x_{3,2}, x_{1,3}\},$$

$$\{B_{1,i}\}_{i=0}^{3} = \{x_{3,0}, x_{2,1}, x_{1,2}, x_{0,3}\} --$$

UNITED STATES PATENT AND TRADEMARK OFFICE
CERTIFICATE OF CORRECTION

PATENT NO. : 7,233,623 B1
APPLICATION NO. : 09/390554
DATED : June 19, 2007
INVENTOR(S) : Pau et al.

It is certified that error appears in the above-identified patent and that said Letters Patent is hereby corrected as shown below:

Column 9, Line 22-31 Delete:

$$ `` p = \begin{bmatrix} A_1[0]^{1,0} \\ A_3[0]^{1,0} \\ B_3[0]^{1,0} \\ B_1[0]^{1,0} \\ A_1[0]^{1,1} \\ A_3[0]^{1,1} \\ B_3[0]^{1,1} \\ B_1[0]^{1,1} \end{bmatrix}, p = \begin{bmatrix} A_1[1]^{1,0} \\ A_3[1]^{1,0} \\ B_3[1]^{1,0} \\ B_1[1]^{1,0} \\ A_1[1]^{1,1} \\ A_3[1]^{1,1} \\ B_3[1]^{1,1} \\ B_1[1]^{1,1} \end{bmatrix}, q = \begin{bmatrix} A_1[2]^{1,0} \\ A_3[2]^{1,0} \\ B_3[2]^{1,0} \\ B_1[2]^{1,0} \\ A_1[2]^{1,1} \\ A_3[2]^{1,1} \\ B_3[2]^{1,1} \\ B_1[2]^{1,1} \end{bmatrix}, s = \begin{bmatrix} A_1[3]^{1,0} \\ A_3[3]^{1,0} \\ B_3[3]^{1,0} \\ B_1[3]^{1,0} \\ A_1[3]^{1,1} \\ A_3[3]^{1,1} \\ B_3[3]^{1,1} \\ B_1[3]^{1,1} \end{bmatrix} " $$

Insert:

$$ -- p = \begin{bmatrix} A_1[0]^{1,0} \\ A_3[0]^{1,0} \\ B_3[0]^{1,0} \\ B_1[0]^{1,0} \\ A_1[0]^{1,1} \\ A_3[0]^{1,1} \\ B_3[0]^{1,1} \\ B_1[0]^{1,1} \end{bmatrix}, q = \begin{bmatrix} A_1[1]^{1,0} \\ A_3[1]^{1,0} \\ B_3[1]^{1,0} \\ B_1[1]^{1,0} \\ A_1[1]^{1,1} \\ A_3[1]^{1,1} \\ B_3[1]^{1,1} \\ B_1[1]^{1,1} \end{bmatrix}, r = \begin{bmatrix} A_1[2]^{1,0} \\ A_3[2]^{1,0} \\ B_3[2]^{1,0} \\ B_1[2]^{1,0} \\ A_1[2]^{1,1} \\ A_3[2]^{1,1} \\ B_3[2]^{1,1} \\ B_1[2]^{1,1} \end{bmatrix}, s = \begin{bmatrix} A_1[3]^{1,0} \\ A_3[3]^{1,0} \\ B_3[3]^{1,0} \\ B_1[3]^{1,0} \\ A_1[3]^{1,1} \\ A_3[3]^{1,1} \\ B_3[3]^{1,1} \\ B_1[3]^{1,1} \end{bmatrix} -- $$

Column 10, Line 22

Delete: `` $t = \begin{cases} 1 & \textit{per stage} = 0 \\ 2 & \textit{per stage} = 1 \end{cases}$ "

Insert: -- $t = \begin{cases} 1 & \textit{per stage} = 0 \\ 2 & \textit{per stage} = 1 \end{cases}$ --

UNITED STATES PATENT AND TRADEMARK OFFICE
CERTIFICATE OF CORRECTION

PATENT NO. : 7,233,623 B1
APPLICATION NO. : 09/390554
DATED : June 19, 2007
INVENTOR(S) : Pau et al.

Page 3 of 5

It is certified that error appears in the above-identified patent and that said Letters Patent is hereby corrected as shown below:

Column 12, Line 28-43 Delete: " $y_i = [y_{i,0} \quad y_{i,1} \quad \cdots \quad y_{i,7}]$ $$\{f_{0,r}\}_{r=0}^{7} = DCT(\{A_{1,i}\}_{i=0}^{7}), \quad \{f_{4,r}\}_{r=0}^{7} = DCT(\{B_{7,i}\}_{i=0}^{7}),$$

$$\{f_{1,r}\}_{r=0}^{7} = DCT(\{A_{3,i}\}_{i=0}^{7}), \quad \{f_{5,r}\}_{r=0}^{7} = DCT(\{B_{5,i}\}_{i=0}^{7}),$$

$$\{f_{2,r}\}_{r=0}^{7} = DCT(\{A_{5,i}\}_{i=0}^{7}), \quad \{f_{6,r}\}_{r=0}^{7} = DCT(\{B_{3,i}\}_{i=0}^{7}),$$

$$\{f_{3,r}\}_{r=0}^{7} = DCT(\{A_{7,i}\}_{i=0}^{7}), \quad \{f_{7,r}\}_{r=0}^{7} = DCT(\{B_{1,i}\}_{i=0}^{7}),$$

$$\{A_{1,i}\}_{i=0}^{7} = \{x_{0,0} \quad x_{1,1} \quad x_{2,2} \quad x_{3,3} \quad x_{4,4} \quad x_{5,5} \quad x_{6,6} \quad x_{7,7},$$

$$\{A_{3,i}\}_{i=0}^{7} = \{x_{1,0} \quad x_{4,1} \quad x_{7,2} \quad x_{5,3} \quad x_{2,4} \quad x_{0,5} \quad x_{3,6} \quad x_{6,7},$$

$$\{A_{5,i}\}_{i=0}^{7} = \{x_{2,0} \quad x_{7,1} \quad x_{3,2} \quad x_{1,3} \quad x_{6,4} \quad x_{4,5} \quad x_{0,6} \quad x_{5,7},$$

$$\{A_{7,i}\}_{i=0}^{7} = \{x_{3,0} \quad x_{5,1} \quad x_{1,2} \quad x_{7,3} \quad x_{0,4} \quad x_{6,5} \quad x_{2,6} \quad x_{4,7},$$

$$\{B_{7,i}\}_{i=0}^{7} = \{x_{4,0} \quad x_{2,1} \quad x_{6,2} \quad x_{0,3} \quad x_{7,4} \quad x_{1,5} \quad x_{5,6} \quad x_{3,7},$$

$$\{B_{5,i}\}_{i=0}^{7} = \{x_{5,0} \quad x_{0,1} \quad x_{4,2} \quad x_{6,3} \quad x_{1,4} \quad x_{3,5} \quad x_{7,6} \quad x_{2,7}\},$$

$$\{B_{3,i}\}_{i=0}^{7} = \{x_{6,0} \quad x_{3,1} \quad x_{0,2} \quad x_{2,3} \quad x_{5,4} \quad x_{7,5} \quad x_{4,6} \quad x_{1,7}\},$$

$$\{B_{1,i}\}_{i=0}^{7} = \{x_{7,0} \quad x_{6,1} \quad x_{5,2} \quad x_{4,3} \quad x_{3,4} \quad x_{2,5} \quad x_{1,6} \quad x_{0,7}\}$$ "

UNITED STATES PATENT AND TRADEMARK OFFICE
CERTIFICATE OF CORRECTION

PATENT NO. : 7,233,623 B1
APPLICATION NO. : 09/390554
DATED : June 19, 2007
INVENTOR(S) : Pau et al.

It is certified that error appears in the above-identified patent and that said Letters Patent is hereby corrected as shown below:

Column 12, Line 28 (Cont.)   Insert:

$$-- y_i = \begin{bmatrix} y_{i,0} & y_{i,1} & \cdots & y_{i,7} \end{bmatrix}$$

$$\{f_{0,r}\}_{r=0}^{7} = DCT(\{A_{1,i}\}_{i=0}^{7}), \quad \{f_{4,r}\}_{r=0}^{7} = DCT(\{B_{7,i}\}_{i=0}^{7}),$$

$$\{f_{1,r}\}_{r=0}^{7} = DCT(\{A_{3,i}\}_{i=0}^{7}), \quad \{f_{5,r}\}_{r=0}^{7} = DCT(\{B_{5,i}\}_{i=0}^{7}),$$

$$\{f_{2,r}\}_{r=0}^{7} = DCT(\{A_{5,i}\}_{i=0}^{7}), \quad \{f_{6,r}\}_{r=0}^{7} = DCT(\{B_{3,i}\}_{i=0}^{7}),$$

$$\{f_{3,r}\}_{r=0}^{7} = DCT(\{A_{7,i}\}_{i=0}^{7}), \quad \{f_{7,r}\}_{r=0}^{7} = DCT(\{B_{1,i}\}_{i=0}^{7}),$$

$$\{A_{1,i}\}_{i=0}^{7} = \{x_{0,0} \quad x_{1,1} \quad x_{2,2} \quad x_{3,3} \quad x_{4,4} \quad x_{5,5} \quad x_{6,6} \quad x_{7,7}\},$$

$$\{A_{3,i}\}_{i=0}^{7} = \{x_{1,0} \quad x_{4,1} \quad x_{7,2} \quad x_{5,3} \quad x_{2,4} \quad x_{0,5} \quad x_{3,6} \quad x_{6,7}\},$$

$$\{A_{5,i}\}_{i=0}^{7} = \{x_{2,0} \quad x_{7,1} \quad x_{3,2} \quad x_{1,3} \quad x_{6,4} \quad x_{4,5} \quad x_{0,6} \quad x_{5,7}\},$$

$$\{A_{7,i}\}_{i=0}^{7} = \{x_{3,0} \quad x_{5,1} \quad x_{1,2} \quad x_{7,3} \quad x_{0,4} \quad x_{6,5} \quad x_{2,6} \quad x_{4,7}\},$$

$$\{B_{7,i}\}_{i=0}^{7} = \{x_{4,0} \quad x_{2,1} \quad x_{6,2} \quad x_{0,3} \quad x_{7,4} \quad x_{1,5} \quad x_{5,6} \quad x_{3,7}\},$$

$$\{B_{5,i}\}_{i=0}^{7} = \{x_{5,0} \quad x_{0,1} \quad x_{4,2} \quad x_{6,3} \quad x_{1,4} \quad x_{3,5} \quad x_{7,6} \quad x_{2,7}\},$$

$$\{B_{3,i}\}_{i=0}^{7} = \{x_{6,0} \quad x_{3,1} \quad x_{0,2} \quad x_{2,3} \quad x_{5,4} \quad x_{7,5} \quad x_{4,6} \quad x_{1,7}\},$$

$$\{B_{1,i}\}_{i=0}^{7} = \{x_{7,0} \quad x_{6,1} \quad x_{5,2} \quad x_{4,3} \quad x_{3,4} \quad x_{2,5} \quad x_{1,6} \quad x_{0,7}\} \quad --$$

Column 15, Line 56   Delete: "two stage"
Insert: --two stages--

Column 20, Line 67   Delete: " {l[0],m[0],n[0],o[0]} is }a[0],b[0],c[0],d[0]} "
Insert: -- {l[0],m[0],n[0],o[0]} is {a[0],b[0],c[0],d[0]} --

UNITED STATES PATENT AND TRADEMARK OFFICE
CERTIFICATE OF CORRECTION

PATENT NO.       : 7,233,623 B1
APPLICATION NO.  : 09/390554
DATED            : June 19, 2007
INVENTOR(S)      : Pau et al.

It is certified that error appears in the above-identified patent and that said Letters Patent is hereby corrected as shown below:

Column 21, Line 3    Delete: " $\}a[0],b[0],c[0],d[0]\}$ "
                     Insert: -- $\{a[0],b[0],c[0],d[0]\}$ --

Column 22, Line 30   Delete: "1'vector"
                     Insert: --1' vector--

Column 24, Line 5    Delete: " $= \begin{cases} 2C_8^3 \times I_{8\times 8} & \text{per stage} = 0 \\ -(H_6)_8 & \text{per stage} = 1 \end{cases}$ , "

Insert: -- $B = \begin{cases} 2C_8^3 \times I_{8\times 8} & \text{per stage} = 0 \\ -(H_6)_8 & \text{per stage} = 1 \end{cases}$ , --

Column 24, Line 10   Delete: " $= \begin{cases} 2C_4^1 \times I_{8\times 8} & \text{per stage} = 0 \\ (H_4)_8 & \text{per stage} = 1 \end{cases}$ , "

Insert: -- $C = \begin{cases} 2C_4^1 \times I_{8\times 8} & \text{per stage} = 0 \\ (H_4)_8 & \text{per stage} = 1 \end{cases}$ , --

Signed and Sealed this

Sixth Day of May, 2008

JON W. DUDAS
*Director of the United States Patent and Trademark Office*